(12) United States Patent
Renken et al.

(10) Patent No.: US 8,649,421 B2
(45) Date of Patent: Feb. 11, 2014

(54) CABLE MODEM FOR NETWORK MEASUREMENTS

(75) Inventors: Thomas Renken, Indianapolis, IN (US); Gregory W. Massey, Greenfield, IN (US)

(73) Assignee: JDS Uniphase Corporation, Milpitas, CA (US)

( * ) Notice: Subject to any disclaimer, the term of this patent is extended or adjusted under 35 U.S.C. 154(b) by 37 days.

(21) Appl. No.: 13/399,797

(22) Filed: Feb. 17, 2012

(65) Prior Publication Data

US 2012/0213259 A1 Aug. 23, 2012

Related U.S. Application Data

(60) Provisional application No. 61/444,611, filed on Feb. 18, 2011.

(51) Int. Cl.
  *H04L 5/16* (2006.01)
  *H04L 1/02* (2006.01)

(52) U.S. Cl.
  USPC .......................................... 375/222; 375/347

(58) Field of Classification Search
  USPC ............... 375/222, 347, 349; 370/241.1, 250, 370/468; 709/224, 236; 715/43, 44, 107, 715/112, 113, 227
  See application file for complete search history.

(56) References Cited

U.S. PATENT DOCUMENTS

| | | | |
|---|---|---|---|
| 6,385,237 B1 | 5/2002 | Tsui et al. | 375/228 |
| 6,393,478 B1 | 5/2002 | Bahlmann | 709/224 |
| 6,588,016 B1 | 7/2003 | Chen et al. | 725/111 |
| 7,269,159 B1 * | 9/2007 | Lai | 370/352 |
| 7,372,872 B2 | 5/2008 | Danzig et al. | 370/480 |
| 7,489,641 B2 | 2/2009 | Miller et al. | 370/241.1 |
| 7,694,317 B2 | 4/2010 | Miyazoe et al. | 725/14 |
| 7,782,898 B2 | 8/2010 | Chapman et al. | 370/468 |
| 7,792,183 B2 | 9/2010 | Massey et al. | 375/227 |

(Continued)

OTHER PUBLICATIONS

White Paper: Full-Band Capture Cable Digital Tuning, Broadcom Corporation, Jun. 2011 (3128-WP100.pdf).

(Continued)

*Primary Examiner* — Khai Tran
(74) *Attorney, Agent, or Firm* — Matthew A. Pequignot; Pequignot + Myers LLC

(57) ABSTRACT

The invention relates to measurement-capable cable modems for cable networks. Idle receivers and transmitters of a cable modem are used to perform upstream and downstream measurements on DOCSIS and non-DOCSIS digital and analog TV channels without disrupting customer services. A currently idle receiver is tuned to a target downstream channel under directions of a modem measurement controller, and is queried by the measurement controller to perform a measurement as specified by a measurement plan. A currently idle transmitter is tuned to a target upstream channel to transmit a test signal that is received by an upstream measurement system. Measurements are communicated to a central measurement controller, for example located at the headend, which collects measurements from a plurality of cable modems and the upstream measurement system. The resulting monitoring system performs cable network wide monitoring using existing cable modems without requiring additional monitoring devices.

19 Claims, 17 Drawing Sheets

(56) References Cited

U.S. PATENT DOCUMENTS

| | | | |
|---|---|---|---|
| 7,961,719 B2* | 6/2011 | Chappell | 370/352 |
| 2004/0073664 A1 | 4/2004 | Bestermann | 709/224 |
| 2004/0103442 A1 | 5/2004 | Eng | 725/126 |
| 2005/0114879 A1 | 5/2005 | Kamieniecki | 725/15 |
| 2005/0286486 A1 | 12/2005 | Miller | 370/351 |
| 2006/0141971 A1 | 6/2006 | Howard | 455/296 |
| 2007/0133425 A1 | 6/2007 | Chappell | 370/250 |
| 2008/0089402 A1 | 4/2008 | Massey et al. | 375/227 |
| 2009/0096665 A1 | 4/2009 | Maxson et al. | 342/357.21 |
| 2009/0185037 A1 | 7/2009 | Shi et al. | 348/184 |
| 2009/0268034 A1 | 10/2009 | Nowotarski et al. | 348/181 |
| 2009/0271836 A1 | 10/2009 | Maxson et al. | 725/107 |

OTHER PUBLICATIONS

SP-CMCIv3.0 2008, Cable Modem to Customer Premise Equipment Interface Specification, Mar. 20, 2008.

SP-PHYv3.0 2010 Physical Layer Specification, Oct. 8, 2010.

SP-MULPIv3.0 2011 MAC and Upper Layer Protocols Interface Specification, Jun. 23, 2011.

SP-OSSIv3.0 2011 Operations Support System Interface Specification, Jun. 23, 2011.

PathTrak™ Product Brochure, JDSU, Oct. 2009.

* cited by examiner

CABLE MODEM FOR NETWORK MEASUREMENTS

CROSS-REFERENCE TO RELATED APPLICATIONS

The present invention claims priority from U.S. Provisional Patent Application No. 61/444,611 filed Feb. 18, 2011, entitled "Using Cable Modems for CATV Network Monitoring", which is incorporated herein by reference.

TECHNICAL FIELD

The present invention relates to systems, methods and devices for monitoring cable networks, and in particular to monitoring cable networks using measurement capable cable modems.

BACKGROUND OF THE INVENTION

Two-way hybrid fiber-coaxial (HFC) networks are shared bi-directional networks with point-to-multipoint transmission in the downstream direction, and multipoint-to-point transmission in the upstream direction. Signals are distributed via a fiber optic connection from a head-end to a node that converts the optical signal to an electrical signal, and then distributes the signals to residences via a tree and branch coaxial cable distribution network. At the subscriber side, terminal equipment supports the delivery of cable services (video, data and voice services) to subscribers, via cable modems. Data and voice services are supported by cable modems and communication gateways, respectively, which require the use of an upstream signal path. The network uses a fiber optic upstream signal path from the node to the head-end. A return band is used to support transmissions from devices at subscribers' premises back to the head-end. In such networks, many cable modems may compete for communication bandwidth in both the upstream and downstream directions.

A cable modem generally uses standardized communication protocol based on the Data over Cable System Interface Specification (DOCSIS®) to access data services through the cable network, by using the downstream path to indicate exactly when each modem is permitted to transmit in the upstream direction. DOCSIS outlines issues related to system maintenance, operation and network communications.

The DOCSIS utilizes two primary data transmission elements: (a) Cable Modem Termination System (CMTS) located in specified nodes on the HFC network for distributing data to end-of-line subscribers, and (b) a Cable Modem (CM) residing at subscriber's premise. Additional network elements may be placed inside the cable network to support service delivery or to monitor service quality. In general, a user connects a cable modem to the TV outlet for his or her cable TV, and the cable TV operator connects a cable modem termination system ("CMTS") in the operator's headend and/or hub. Subscribers send data from their digital devices, such as personal computers (PC), VoIP phone, Video IP device, etc, into the cable modem, which then relays the data to the CMTS, which in turn relays the information to an appropriate network element. Information destined to the subscriber digital device is provided from the network to the CMTS, which in turn relays the information to the CM. The CM in turn relays the information to the subscriber's digital device. The communication direction from the CMTS to the CM is referred to as the downstream direction, while the communication direction from the CM to the CMTS is referred to as the upstream direction.

The fourth version of DOCSIS®, DOCIS® 3.0, was released in August 2006; it specifies support for channel bonding that provides a flexible way to significantly increase transmissions speeds, both upstream and downstream, and introduces support for Internet Protocol version 6 (IPv6) and support for IPTV. The term 'channel bonding' means a process that combines data received on multiple independent channels into one higher-speed data stream.

DOCSIS® 3.0 physical layer specification provides for a normal downstream operating range from 50 MHz to 1002 MHz, with either 6 MHz or 8 MHz spacing for downstream channels, which utilize 64-QAM or 256-QAM modulation format. The upstream operating frequency range may be between 5 and 42 MHz, or 5 to 85 MHz. The upstream channel widths may be between 200 kHz and 6.4 MHz, with the upstream data modulated with either QPSK, 16-QAM, 32-QAM, 64-QAM or 128-QAM.

In order to increase downstream and upstream throughput, DOCSIS 3.0 compliant CMs have the ability to flexibly bond at least 4 channels in the downstream and at least 4 channels in the upstream. Channel bonding can be implemented independently on upstream channels or downstream channels. DOCSIS 3.0 enables a total upstream throughput of 30.72 Mbit/s per 6.4 MHz channel using 64-QAM at 5.12 Msps symbol rate, and a downstream throughput with 256-QAM of up to 42.88 Mbit/s per 6 MHz channel, or 55.62 Mbit/s per 8 MHz channel for EuroDOCSIS.

With the channel bonding, the maximum throughput increases in proportion to the number of channels being bonded. Future versions of DOCSIS will likely require that cable modems bond an increasing number downstream and upstream channels.

One technical challenge in operating a network having a bidirectional communication path on a shared medium between the headend and each remote point is maintaining network integrity for upstream and downstream signals. Noise and other undesirable energy originating at one remote point or at any point along the return path from that remote point can impair network communications for all remote points in the network. Similarly, where noise and undesirable energy from one remote point is combined with noise and or other RF impairments from other remote points in the network, network communications may be impaired. RF impairments may occur in many forms including, but not limited to, impulse and/or burst noise, common path distortion, and ingress such as interference from radio communication and navigation signals. Impulse noise or burst noise typically consists of high-power, short-duration energy pulses. Ingress is unwanted RF energy that enters the communication path from a source external to the communication path. Ingress often comprises radio and/or navigational communication signals propagated over the air that enter a weak point in a wireline network, although it may also comprise impulse and/or burst noise that is similarly propagated over the air to enter the network at a weak point. Weak points in the network often occur where there is a cable shield discontinuity, improperly grounded electrical device, or a faulty connector at or near a remote point. When radio frequency carriers from shortwave radio, citizen's band radio, or other broadcast sources enter the network at these weak points, they may cause interference peaks at specific carrier frequencies in the communication path. Common path distortion may be the result of second and higher order mixing products from the downstream channel that couple to the upstream channel;

such nonlinear mixing may occur, for example, when physical electromechanical connectors corrode and oxidize, creating point contact diodes.

Therefore, an ability to monitor the performance of the cable network and to quickly and efficiently isolate impairments in the cable network is essential for the cable network operation. Heretofore two main approaches have been used in cable network monitoring: the use of dedicated measurement equipment, either pre-installed throughout the network or portable, by a technician performing a service call, and remote polling of the installed modem base. The remote polling utilizes capabilities of a conventional DOCSIS CM to perform a range of signal measurements on downstream DOCSIS channels used by the CM to determine such performance related parameters as the downstream reception level, upstream transmission level, downstream signal to noise ratio (SNR), downstream code word error (CWE), etc. The headed may collect measured values of these parameters by polling the CMs.

For example, U.S. Patent application No. 2004/0073664 by Bestermann and U.S. Pat. No. 6,393,478 issued to Bahlmann disclose systems in which a cable modem is utilized to transmit status information to another device for analysis over the network. In Bestermann's system, the cable modem includes server software that communicates with client software through the CMTS at the head-end. The modem measures I, Q values on the DOCSIS downstream channel allocated to the modem for data communications, and the server software delivers measurement data stored in a buffer of the cable modem. This communication is performed using the IP protocol, so that no portable diagnostic device needs to be coupled to a CM port. However, these measurements may be insufficient for adequate network monitoring, and additional network measurement equipment may be required to fully characterize the network and isolate network faults. In some cases, a technician with a portable network tester may have to be sent to perform network measurements in the field or at customer premises.

U.S. Patent application No. 2004/0103442 by Eng discloses a system for end-of-line monitoring of a node of a DOCSIS network. The system of Eng includes a CMTS having a status monitoring Media Access Control (MAC), a network manager coupled to the CMTS, and status monitoring cable modems at termination points. The status monitoring cable modem of Eng includes a dedicated measuring device for detecting and measuring downstream communication signals and a transmitter for transmitting status information over a dedicated service channel to the status monitoring MAC at the CMTS. One drawback of the system of Eng is that it lacks the ability to perform measurements in the upstream path, or to monitor non-DOCSIS downstream channels.

A somewhat different approach has been disclosed in U.S. Patent Application 2007/0133425, which is assigned to the assignee of the present application. This application teaches an end-of-line (EOL) monitoring system that utilizes end-of-line monitors and a central network monitoring server. The end-of-line monitor includes a main tuner dedicated to receiving measurement requests from the network monitoring server via a DOCSIS downstream channel, and an auxiliary tuner used for the purpose of performing measurements of the downstream channel by analogue and digital measurement circuits. The addition of the auxiliary tuner permits faster measurements to be performed by the EOL monitoring system and reported back to the server, thereby affording real-time remote testing and diagnostics. This approach, however, may require installing a potentially large number of dedicated end-of-line equipment solely for the purpose of network monitoring.

Accordingly there still remains a clear need for an economical network monitoring system and method that is capable of network-wide monitoring without adding dedicated end-of-line measurement equipment, and which is capable of testing both the downstream and the upstream communication paths. This invention addresses this need in the art as well as other needs, which will become apparent to those skilled in the art from this disclosure.

It is therefore an object of the present invention to provide a system that improves the prior art by overcoming at least some of the disadvantages and limitations thereof by utilizing intrinsic capabilities of DOCSIS® 3.0 compatible cable modems.

SUMMARY OF THE INVENTION

In accordance with the invention there is provided, a measurement-capable cable modem (MCCM) comprises: a cable port for connecting to a cable network, a data port for connecting to a customer premises equipment (CPE) for providing customer services, a plurality of transmitters coupled to the cable port for transmitting upstream digital communication signals from the CPE over one or more upstream channels of the cable network, a plurality of receivers coupled to the cable port for receiving downstream digital communication signals over one or more downstream channels of the cable network for communicating to the CPE, and a modem controller coupled to the transmitters and the receivers for controlling thereof. The modem controller is configured for tunably allocating at least one of the receivers and at least one of the transmitters for data communications between the cable network and the CPE, while leaving at least another one of the receivers as a currently idle receiver that is not allocated for the data communications, or leaving at least another one of the transmitters as a currently idle transmitter that is not allocated for the data communications. The modem controller further comprises a measurement controller for utilizing the currently idle receiver or the currently idle transmitter to perform a network measurement.

In accordance with another aspect of this invention, there is provided a method for monitoring a cable network using idle receivers and/or transmitters of a plurality of measurement capable cable modems disposed at customer premises at different locations in the cable network for providing customer services. The cable network comprises a network node, a cable modem termination system (CMTS) disposed at least in part at the network node, a cable modem (CM) disposed at a customer location for connecting to a CPE, and a cable link for coupling the CMTS to the CM for providing customer services. The CM comprises a plurality of receivers for receiving downstream data communication signals from the network node over one or more downstream channels and a plurality of transmitters for transmitting upstream data communication signals over one or more upstream channels to the CMTS. The method comprises: a) allocating at least one of the receivers and at least one of the transmitters to data communications between the CMTS and the CPE, leaving at least another one receiver or at least another one transmitter as a currently idle receiver or transmitter, respectively, that is not allocated to the data communications; and, b) performing a network measurement using the currently idle receiver or the currently idle transmitter. The method may further comprise identifying the currently idle receiver or the currently idle transmitter at the CM for determining a current measurement capability of the CM.

Another aspect of the present invention relates to a cable network monitoring system, comprising a plurality of measurement-capable cable modems (MCCMs) disposed at a plurality of locations for providing customer services, each MCCM comprising a plurality of receivers for receiving downstream data signals over a plurality of downstream channels from a common CMTS and a plurality of transmitters for transmitting upstream data signals over a plurality of upstream channels to the common CMTS, the cable network monitoring system further comprising an external measurement controller in communication with the MCCMs for directing one or more of the MCCMs to utilize an idle receiver or an idle transmitter to perform a downstream channel measurement or an upstream channel measurement, and for collecting measurement results from the one or more MCCMs. Downstream measurements from one MCCM may be compared to the results from other MCCMs or downstream monitoring systems that reside within the CATV network.

The present invention, according to one aspect thereof, relates to DOCSIS cable modems and DOCSIS cable networks. In one aspect of the present invention, the modem controller of the measurement-capable DOCSIS cable modem comprises data processing means for measuring non-DOCSIS signals.

BRIEF DESCRIPTION OF THE DRAWINGS

The invention will be described in greater detail with reference to the accompanying drawings which represent preferred embodiments thereof, in which like reference numerals are used to designate like elements, and wherein.

DETAILED DESCRIPTION

Figure 1:
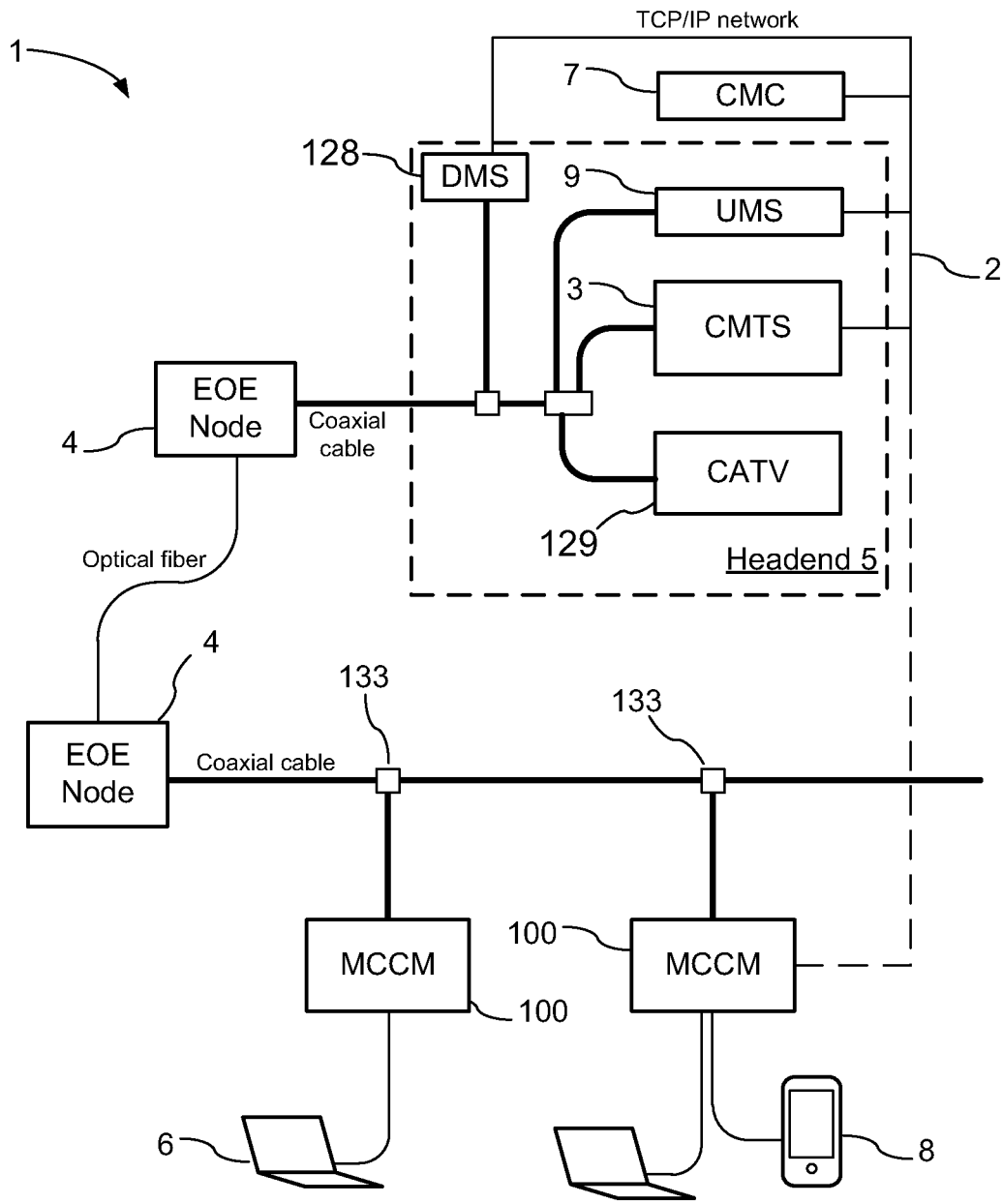
FIG. 1 is a schematic diagram of a cable network incorporating modem-based network monitoring according to an embodiment of the present invention.

Reference herein to any embodiment means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The following is a partial list of acronyms used in the present specification:
HFC Hybrid Fiber-Coaxial
USB Universal Serial Bus
LAN Local Area Network
HFC Hybrid Fiber—Coaxial
FPGA Field Programmable Gate Array
QAM Quadrature Amplitude Modulation
CPE Customer Premises Equipment
CMTS Cable Modem Termination System
RF Radio Frequency
IF Intermediate Frequency
ROM Read Only Memory
RAM Random Access Memory
FIFO First In First Out
ADC Analog to Digital Converter
DDC Digital Down Converter
DUC Digital Up Converter
MPEG Moving Picture Experts Group (refers to a standard)
MER Modulation Error Ratio
BER Bit Error Rate
FPGA Field Programmable Gate Array
ASIC Application Specific Integrated Circuit
DOCSIS Data Over Cable Service Interface Specification The present invention relates to using idle capabilities of a cable modem (CM) to perform measurements on a plurality of downstream and/or upstream channels in a cable network while retaining the ability of the modem to provide customer services simultaneously with the measurements.

In order to support flexible, on-demand channel bonding, cable modems may include multiple downstream receivers and multiple upstream transmitters. In particular, DOCSIS 3.0 compliant CMs have the ability to bond at least 4 channels in the downstream and at least 4 channels in the upstream so as to achieve high data transfer rates. Accordingly, a DOCSIS 3.0 compliant CM should have at least 4 receivers and 4 transmitters, which are not all always in use during normal operation of the modem. Many CMs have 8 receivers. Future versions of DOCSIS will likely require the capability to bond an increasing number downstream and upstream channels, and a correspondingly increasing number of receivers and transmitters. Generally, the present invention relates to CMs that incorporate at least two receivers and at least two transmitters, which are not always in use simultaneously during normal operation of the modem.

Subscriber data services do not need to use all the transmitters or receivers at all times. Receivers or transmitters that are currently not used to support the customer services, i.e. are not allocated for customer data transmission or reception at a particular moment during modem's operation, are referred to herein as idle transmitters or idle receivers, respectively. According to an aspect of the present invention, such idle receivers and/or transmitters are used to perform network measurements. Hardware capabilities of DOCSIS modems are exploited to perform carrier level, channel scans, hum, and/or digital quality measurements on any or all downstream channels of the cable plant using one or more of their idle downstream receivers. In one aspect of the present invention, DOCSIS modems with two or more upstream transmitters are used to transmit test signals to other equipment on the network using one or more of their upstream transmitters in order to perform network upstream tests. In preferred embodiments, the cable modems perform these network tests using currently idle receivers or transmitters while continuing to provide data services for the subscriber with the remaining transmitters and receivers.

Additionally, the transmitters and receivers actively used in a DOCSIS connection could also be used to perform both active and passive network service tests to measure the DOCSIS connection characteristics, as known in the art. These tests are preferably designed to have negligible impact upon the customer's use of the DOCSIS connection.

In one embodiment of this invention, subscriber CMs are furnished with measurement software providing the extra measurement capabilities. This enables cable operators to add network monitoring and diagnostic services without installing extra equipment at subscriber premises. In one embodiment, subscriber modems may also contain extra circuitry in order to provide or support measurement capabilities. The added measurement software may run alongside the main cable modem software, either on the same processor, a co-processor, or another processor within the cable modem that has access to all necessary hardware control functions. Cable modems in which hardware resources may be utilized for active and/or passive network measurements while simultaneously supporting customer services, and which include suitable measurement control means, are referred to herein as measurement-capable modems (MCCMs).

With reference to FIG. 1, there is shown an exemplary HFC network 1 including features of the present invention. HFC networks are commonly implemented to deliver Cable Television (CATV) signals, including analog TV signals and digital TV signals, as well as data and control signals, to customer premises such as a home or a business. In the HFC network 1, which is also referred to herein as cable network 1, data services are provided using a DOCSIS transceiver 3, which is commonly referred to as a Cable Modem Termination System (CMTS). As shown, the CMTS 3 is located at the network operator's headend 5, but can also be located at a network hub, as known in the art. TV services are provided using CATV transmitters 129, which may include digital TV (DTV) transmitters and analog TV transmitters. CMTS 3 transmits RF-modulated downstream signals carrying data over a plurality of downstream channels allocated for data services, for example as defined by DOCSIS, while CATV transmitters 129 transmit digital and/or analog CATV signals in a plurality of CATV channels, which generally do not overlap in frequency with the DOCSIS channels. All these signals are distributed using coaxial cables and, optionally, optical fibers to a plurality of MCCMs 100 located at the customer premises. Although FIG. 1 shows only two MCCMs 100 by way of illustration, the HFC network 1 would typically include a large number of MCCMs 100 connected to a plurality of different cable trunks at a plurality of different locations. The CMTS 3 may be located in an optical portion of the network, in which case the downstream and upstream signals undergo electrical-to-optical-to-electrical (EOE) conversion at EOE nodes 4 on the way between the CMTS 3 and the MCCMs 100 as known in the art; see for example US Patent Application 2007/0133425, which is incorporated herein by reference. Optionally a downstream measurement system (DMS) 128 may be provided at the location of the CMTS 3 for monitoring the downstream signals generated by the CMTS 3 and the CATV transmitters 129. The DMS 128 may be embodied, for example, using a remote service analyzer module RSAM-5800$^{XT}$ produced by JDSU Inc.

The downstream signal generated by the CMTS 3 carries control packets and payload packets for the MCCMs 100, and is distributed to a number of RF taps 133 connected in tandem where homes and business hook up. Each RF tap 133 taps off a small amount of the RF signal energy to be delivered to the corresponding MCCM 100. Each MCCM 100 is connected to customer premises equipment (CPE) 6, for example using a wireline or wireless router, a hub, or a direct data connection. Here, CPE may refer to any computing device having a suitable data interface, such as a personal computer, a laptop, a smart phone, a 'smart' appliance, a TV set, etc. Each MCCM 100 extracts from the downstream RF signal those data packets that are aimed as the corresponding CPE 6, and directs them to that CPE 6. In return, each MCCM 100 receives customer-generated data from the CPE 6 and transmits it to the network as upstream signals using shared DOCSIS upstream frequency channels, to be received by the CMTS 3. The upstream signals may be converted from RF to optical domain by an upstream optical transmitter housed within a fiber EOE node on their way to the CMTS 3. These upstream signals are then routed in the CMTS 3, thereby completing the communication circuit.

According to one embodiment of the invention, an external measurement controller (EMC), such as a central measurement controller (CMC) 7 or a local measurement controller (LMC) 8, may direct one or more of the MCCMs 100 to perform a variety of signal measurements that previously required a dedicated measurement instrument. FIG. 1 illustrates a CMC 7 that connects to the CMTS 3 via a TCP/IP network 2 using Internet Protocol (IP), and may or may not be co-located with the CMTS 3. Note that the TCP/IP network 2 is a logical network that may utilize the physical infrastructure of the HFC network 1. In one embodiment, the CMC 7 schedules and instruct MCCMs 100 to perform real time measurements and then collects, evaluates and stores measurement results received from the MCCMs 100, for the purpose of remotely performing automated end-of-line diagnostics.

Continuing to refer to FIG. 1, the cable network 1 may further include an upstream measurement system (UMS) 9 for receiving and analyzing upstream test signals that may be generated by the MCCMs 100 upon a request from the CMC 7. The UMS 9 communicates upstream measurement data to the CMC 7, for example using the IP network 2, or through a direct connection, or any other suitable communication means.

In one embodiment, the MCCMs 100 use a standardized communication signaling protocol based on the DOCSIS® to access data services through the cable network, with the CMTS 3 using the downstream path to indicate when each MCCM 100 is permitted to transmit in the upstream direction. Full details of the DOCSIS® 3.0 are given in the following standards documents, the contents of which are incorporated herein by reference: SP-CMCIv3.0 2008, Cable Modem to Customer Premise Equipment Interface Specification; SP- PHYv3.0 2010 Physical Layer Specification; SP-MULPIv3.0 2011 MAC and Upper Layer Protocols Interface Specification; and SP-OSSIv3.0 2011 Operations Support System Interface Specification.

In one exemplary measurement scenario, the CMC 7 may communicate with the CMTS 3 to request that the CMTS 3 excludes one or more receivers and/or transmitters at one or more MCCMs 100 from DOCSIS channel bonding. The CMC 7 may then signal to the one or more MCCMs 100, for example via IP (internet protocol) messaging, to perform specific measurements with the unused receivers and/or transmitters. In one embodiment, the DOCSIS connection between the CMTS 3 and the MCCM 100 provides a communication path for the CMC 7 to direct the MCCM 100 as to which measurement to perform. After completing the measurement, the MCCM 100 may send the measurement result to CMC 7 over the TCP/IP network 2, for example utilizing a DOCSIS connection to the CMTS 3.

Figure 2:
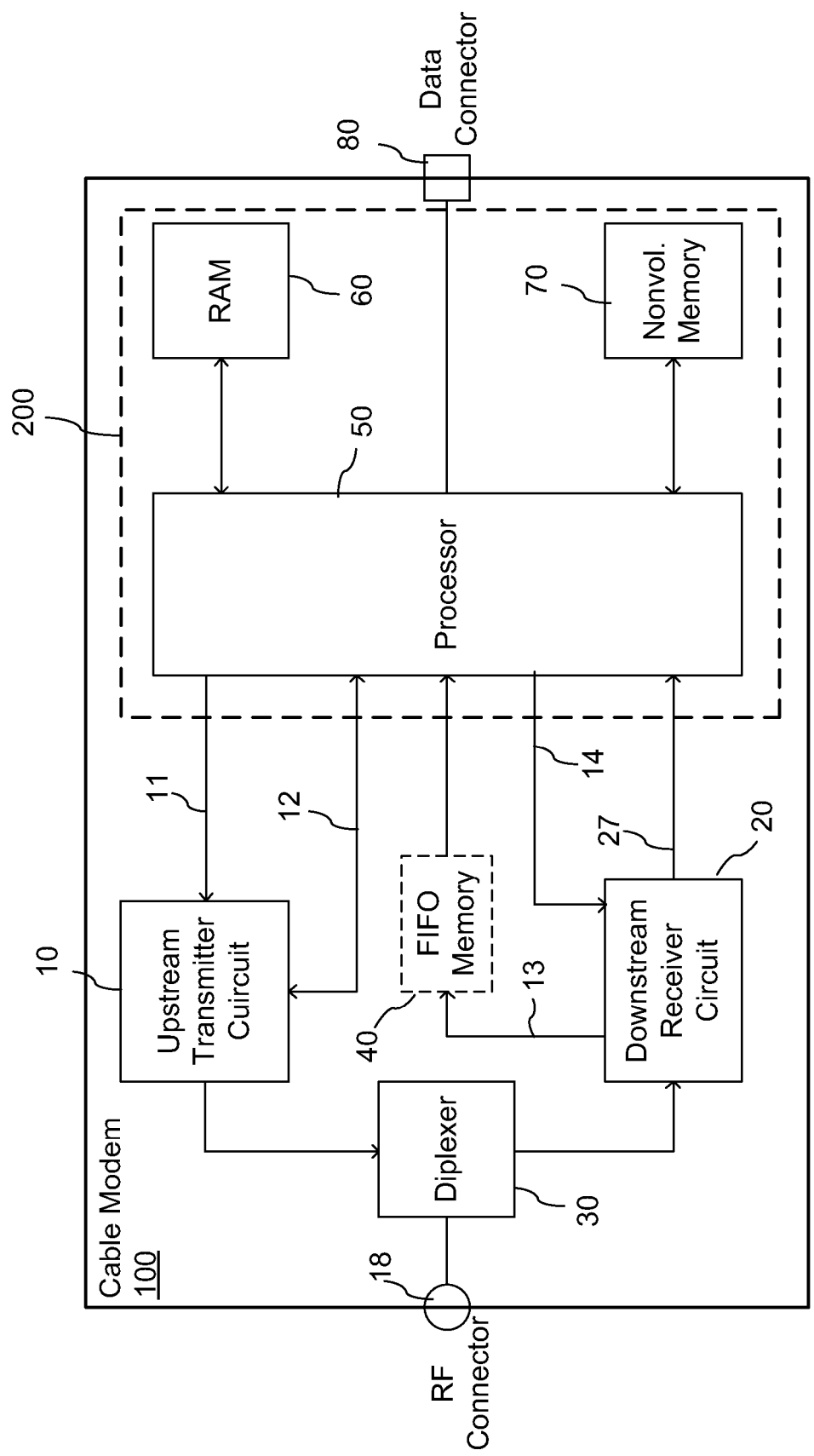
FIG. 2 is a schematic block diagram of a measurement capable cable modem.

With reference to FIG. 2, there is shown a schematic block diagram of the MCCM 100 in accordance with an embodiment of the present invention. Functional units shown as blocks in FIG. 2 may be embodied using dedicated hardware or may be defined logically using shared hardware with dedicated software or firmware. In operation, the MCCM 100 transforms digital data transmitted over RF to one or more data interfaces, such as Ethernet, USB, and others as known in the art. Accordingly, MCCM 100 may be implemented using conventional cable modem hardware compatible with DOCSIS 3.0, adding the measurement functionality as described hereinbelow. Similarly to a conventional cable modem, the MCCM 100 includes a cable port 18 in the form of an RF cable connector for connecting to a cable network, and a data port 80 for connecting to CPE 6 for providing customer services. The data port 80 may include one or more of the following: a USB port, a LAN connector, or any other suitable connector or port, and may include, or be in the form of, a wireless or wireline network adapter. Note that in the context of the present specification, the term 'connected' encompasses both physical wireline connections and wireless connections.

In one embodiment, the cable port 18 is coupled to an upstream transmit circuit (TC) 10 and a downstream receive circuit (RC) 20 through a diplexer 30. The diplexer 30 is responsible for splitting the RF spectrum into upstream and downstream spectra. Data that is received from the network by the MCCM 100 has been transmitted in the downstream spectrum. The MCCM 100 transmits data via the cable port 18 to the CMTS 3 in the upstream spectrum. The TC 10 includes a plurality of transmitters coupled to the cable port 18 in the upstream spectrum for transmitting digital communication signals over one or more upstream channels. Similarly, the RC 20 includes a plurality of receivers coupled to the cable port 18 in the downstream spectrum for receiving digital communication signals over one or more downstream channels. In one embodiment, the MCCM 100 is prohibited from measuring in the upstream spectrum in order for the MCCM 100 to maintain the ability to be operational for the end user. Blocks 10, 20, and 30 may be implemented using commercial cable modem hardware satisfying DOCSIS 3.0 specification.

A controller 200 is connected between the data port 80, the TC 10 and the RC 20, for controlling the modem operation. The controller 200 may also be referred to herein as the MCCM controller, or as the modem controller. One function of the modem controller 200 is to support normal operation of the MCCM 100, wherein the MCCM 100 provides customer services to the end user as known in the art. According to an aspect of the present invention, another function of the controller 200 is to support network measurements using those receivers or transmitters of the modem 100 which are currently idle, i.e. are not used for providing the customer services, such as supporting data traffic to and from the CPE 6. In particular, in one embodiment of the invention the controller 200 provides means for identifying a currently idle receiver or a currently idle transmitter, and for utilizing the currently idle receiver or the currently idle transmitter to perform a network measurement.

In the shown embodiment, the controller 200 includes at least one processor 50, RAM 80 and non-volatile memory (NVM) 70. The processor 50 may be embodied using a single dedicated or shared hardware processor or using multiple hardware processors. In one embodiment, the processor 50 runs a CM software program or programs responsible for all cable modem activities during its normal operation, including providing suitably processed customer data 11 to the TC 10 for transmitting over specified upstream DOCSIS channels, and receiving from the RC 20 and suitably processing demodulated downstream data 27 that were received by the MCCM 100 from CMTS 3 over specified downstream channels. In one embodiment, a measurement program executable by the processor 50 is stored in the NVM 70. In operation, this measurement program may run as separate tasks within the main CM software program on the same processor 50, or it could be a separate measurement program that runs on the same or different hardware processor. Functionality of this measurement software program will become apparent from the description hereinbelow. The RAM 60 is available to the processor 50 to support its operation. Any portion of this memory that the main CM software is not using to support normal operation of the MCCM 100, i.e. for providing customer services, may be used by the measurement software to store data, intermediate calculations, and measurement results to be communicated to the CMC 7 or the LMC 8. The NVM 70 is a computer-readable memory device that can retain information stored therein even when not powered. Examples of non-volatile memory include read-only memory (ROM), programmable ROM (PROM), flash memory, magnetic computer storage devices such as hard disks, optical discs, or any combination thereof. The NVM 70 is used to store both the CM software program and the measurement software program when the modem is not powered. Measurement data from various supported tests could also be saved in non-volatile memory for later access or query by the CMC or LMC.

In one embodiment, the MCCM 100 further includes a FIFO Memory 40 if the MCCM's processor and bus architecture are not capable of capturing the measurement data at the required sampling rates used by the RC 20. The various components of the receiver can stream data to the FIFO 40 at high rates during the actual measurement and the processor 50 can read the data at a slower rate to post-process the results.

Figure 3:
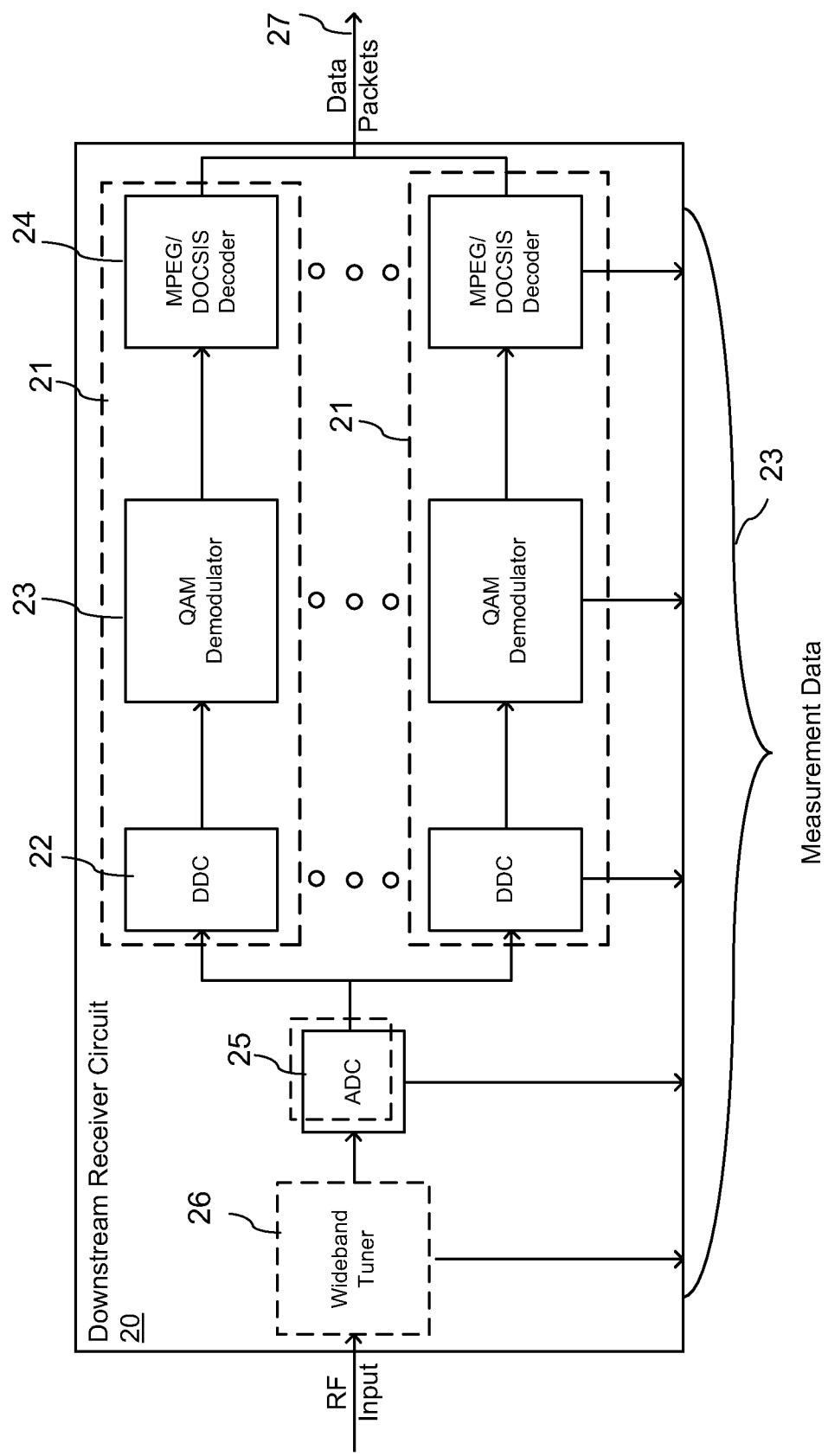
FIG. 3 is a schematic block diagram of a downstream receiver circuit including a plurality of tunable receivers.

Turning now to FIG. 3, there is shown a block diagram of the RC 20 in one embodiment thereof. The RC 20 may be embodied using conventional receiver architecture for DOCSIS® 3.0 compliant cable modems as known in the art. It includes a plurality of constituent downstream channel receivers 21 each capable of demodulating a single downstream channel. DOCSIS® 3.0 currently requires at least four receivers 21. In one embodiment the RC 20 has more than four receivers 21 in order to support extra bonding capacity. The maximum number of bonded channels is likely to increase in the future version of the standard, necessitating an even greater number of the constituent receivers 21.

At any particular moment during normal operation of the MCCM 100, the number of bonded downstream channels in the output 27 of the RC 20 is defined by the CMTS 3 in dependence upon current customer requirements for the downstream bandwidth, and is set by the controller 200 upon receiving a corresponding command from CMTS 3. Often the amount of information that is being transmitted from the CMTS 3 to the CPE 6 does not require the maximum downstream throughput of the MCCM 100, so that one or more of the receivers 21 may be idle for a relatively long time periods, and may be made available for downstream measurements, as described herein below more in detail. Since each of the receivers 21 is tunable in frequency and adjustable in modulation format it can accept, an idle receiver 21 may be used to perform measurements on signals other than those participating in the DOCSIS connection, including analog and digital TV signals, by tuning the idle receiver 21 to a desired central wavelength.

A DOCSIS 3.0 compatible downstream receiver 21 typically includes a DDC 22, followed by a QAM demodulator 23, which is in turn followed by a DOCSIS/MPEG decoder 24. Optionally, a wideband tuner 26, which may be shared between multiple receivers, and one or more ADCs 25 may be connected between the input of the receivers 21 and the cable port 5. The QAM demodulator 23 normally includes an adaptive equalizer (EQ) that is not shown in FIG. 3 but is well known in the art.

The wideband tuner 26 is controlled by the controller 100 and enables the MCCM 100 to tune to a selected group of downstream channels. By way of example and depending on the implementation, a tuner's bandwidth may be as narrow as 6 MHz or as wide as 1 GHz. The input into the tuner 26 is analog RF data from the cutoff frequency of the diplexer 30 to approximately 1 GHz by way of example. The tuner 26 converts the received downstream RF signals to corresponding signals centered at an intermediate frequency (IF). The tuner 26 is optional because all tuning processes can be performed purely digitally using one or more ADCs and DDCs.

The ADC 25 converts the analog IF output from the wideband tuner 26 into a digitized IF signal. In accordance with the invention, the ADC 25 may be queried by the controller 200 for measuring carrier level in the digital domain and to perform spectrum-style measurements within the frequency span covered by the analog IF output of the tuner 26. Depending on the CM processor 50 and ADC speed, the controller 200 may read raw data from the ADC 25 and use specialized data processing algorithms to perform a variety of measurements related to the downstream signal. By way of example, in one embodiment the controller 200 may sub-sample the digital data from the ADC 25 and perform digital filtering and/or a Fourier transform, such as an FFT, so as to obtain downstream carrier levels at different frequencies. In one embodiment, the digital samples gathered from the output of the ADC 25 are stored in RAM 60 and used by the controller 200 for a number of signal measurements on analog CATV channels present in the downstream spectrum. These measurements include, for example, Video and Audio Carrier level measurement, Hum measurement, and Carrier to Noise Ratio (CNR) measurement, all of which can be performed by applying known in the art methods upon the digitized CATV signal extracted from the output of the ADC 25; see, for example, U.S. Pat. No. 5,394,185 for a description of one method of in-service Hum measurements for a CATV signal, and U.S. Pat. Nos. 5,073,822 and 6,219,095 for exemplary methods of in-band in-service CNR measurement and related noise measurements and characterization. In some embodiment, depending on the speed of the MCCM processor and ADC 25, the controller 200 may read raw data from the ADC 25 and use known in the art specialized data processing algorithms to perform measurements on DTV channels such as MER, DQI, and I/Q Constellation plots, if these data are not available from the QAM demodulator 23.

In order to obtain accurate measurements of a target component of the downstream signal received by the MCCM 100 from the digital samples at the output of the ADC 25 or a particular DDC 22, the controller 200 may query control registers of the wideband tuner 26 to obtain its gain characteristics. Depending on a particular implementation of the tuner, these gain characteristics may include one or more of the following: the current tuner gain, the change in tuner gain across the frequency band, and the rate at which the tuner can vary the gain in response to changes in the total power of the all the downstream signals it is receiving. In order to convert the ADC samples into accurate measurements, information regarding the tuner's gain may be required. In one embodiment, the controller 200 reads those values from the tuner 26 and incorporates them into its calculations to obtain measurement results.

The DDC 22 is responsible for filtering out, i.e. selecting, a particular downstream channel, such as a DOCSIS 6 or 8 MHz wide channel, from the digital IF output of the ADC 25. In one embodiment, it converts a digitized real-valued signal centered at the intermediate frequency to a baseband complex signal centered at a zero frequency as known in the art. This complex baseband signal may be composed, for example, of an in-phase signal component I, and a quadrature signal component Q. The input to DDC 22 is the digital IF data from the ADC 25, which typically covers the entire downstream frequency span of the wideband tuner 26. The output of the DDC 22 are I and Q samples for a particular downstream channel within the wideband downstream frequency span. A DOCSIS 3.0 compatible CM typically has four to eight DDCs per downstream receiver circuit 20, one per channel receiver 21. However, this number is expected to increase in the future.

In operation, the DDC 22 of any idle receiver 21, i.e. the receiver 21 that is not currently in use by the MCCM 100 for receiving customer-directed data, may be used to perform various measurements under the direction of the controller 200, such as but not exclusively measurements of analog or digital channel level, downstream frequency response, I/Q Constellation plots, and ingress under the carrier. Alternatively, the two later measurements can be performed with the QAM demodulator 23. Controller 200 may also query control registers of the DDC 22 to obtain DDC gain values, which are then used for computing carrier level parameters and the like.

The output signal of the DDC 22 is demodulated by QAM Demodulator 23, whereby the I and Q samples from the DDC 22 are converted into digital data corresponding to a particular digital channel.

QAM Demodulators 23 of the currently idle receiver or receivers 21 can be queried by the measurement controller 300 to perform a number of measurements, including measuring the following parameters known in the art: MER (modulation error ratio), EQ Stress, Group Delay, in-channel frequency response. Depending on the MCCM hardware, the QAM demodulator 23 may also be queried by the measurement controller 300 to provide the following measurements: I/Q samples that can be used by the measurement controller 300 to generate constellation plots, Ingress under the carrier, DQI™ (Digital Quality Index). Details of a process of computing ingress under the carrier from a block of contiguous I and Q samples read from the output of the QAM demodulator 23 are described in U.S. Pat. No. 6,385,237, which is incorporated herein by reference. DQI may be computed from a filtered SNR (signal to noise ratio) estimate read from the QAM demodulator 23. Details of measuring DQI are disclosed in U.S. Patent Application 2008/0089402, which is assigned to the assignee of the present application and is incorporated herein by reference.

The output data of the QAM demodulator 23 is passed for decoding to the MPEG/DOCSIS decoder 24 as known in the art. The controller 200 may be used to read various performance-related data from the MPEG/DOCSIS decoder 24 to perform a variety of service level tests. For example, conventional MPEG and DOCSIS decoders typically have rate counters and packet error counters that can be read by the controller 200 to measure the following parameters for a corresponding channel: pre-FEC and post-FEC Bit Error Rate (BER), and MPEG data stream errors or error rates.

Additionally, the MPEG/DOCSIS decoders 24 of the receivers 21 that are being used for an active DOCSIS connection can also be used to passively perform a downstream throughput measurement on each downstream DOCSIS channel that is currently used by the MCCM 100 for customer services.

The MCCM controller 200 can also be used to perform active tests without negatively impacting the customer's network connection, such as by adding test packets to customer service related data streams. The measurement program or circuitry of the MCCM controller 200, such as measurement controller 300 shown in FIG. 5, can be used to generate data traffic that enables the following measurements: Upstream and Downstream Throughput, Network connectivity checks (ping), Packet loss, VoIPCheck™, Jitter, for example using known in the art methods; see U.S. Pat. No. 7,489,641 teaching one suitable method of performing VoIPCheck. These tests may require the MCCM controller 200 to generate test data packets as if they originated from a CPE device, send them to an appropriate destination in the TCP/IP network, and intercept and analyze return communications. The destination might be the CMTS 7, such as for a ping test, a throughput test server, etc.

Figure 4:
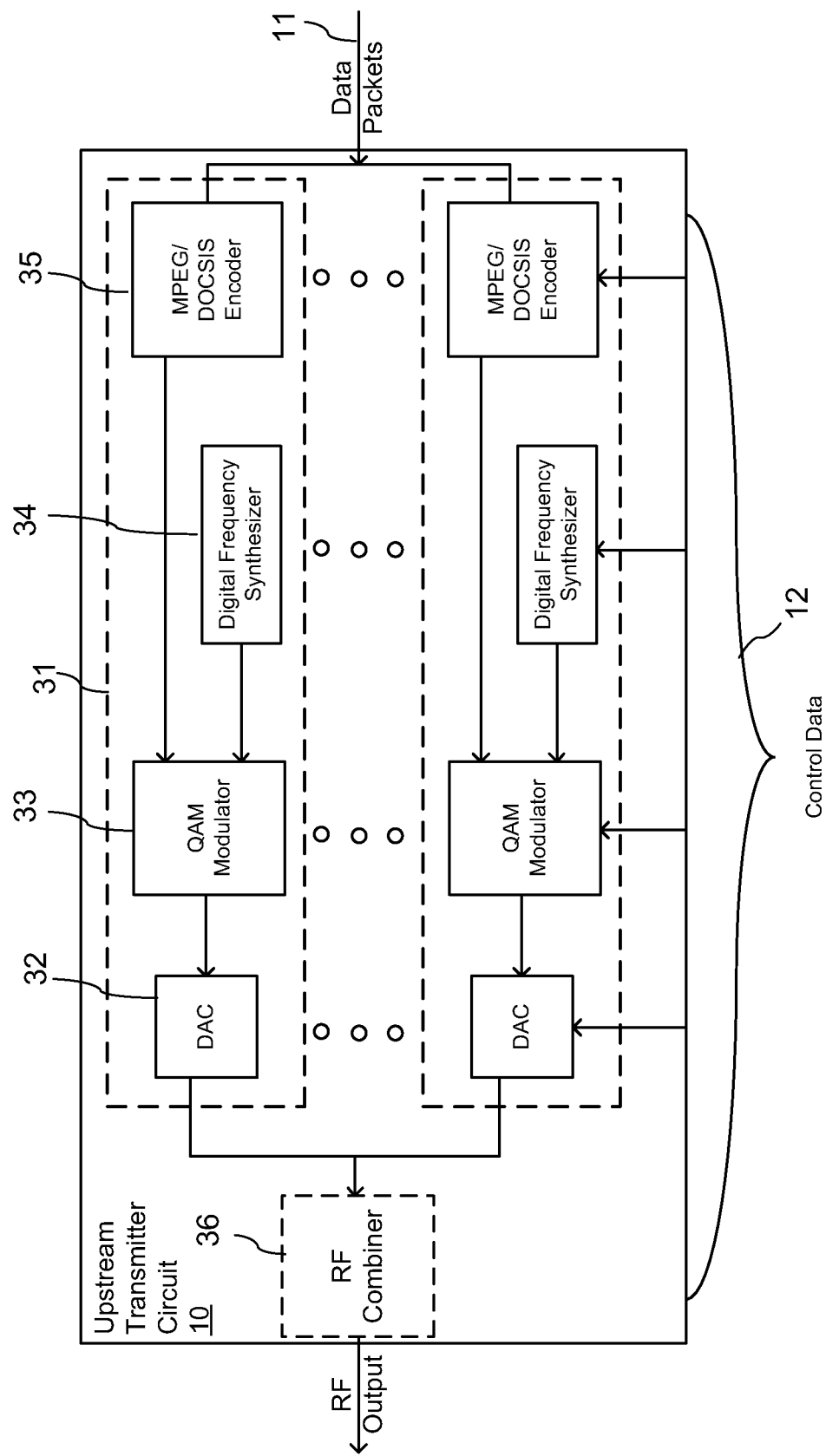
FIG. 4 is a schematic block diagram of an upstream transmitter circuit including a plurality of tunable transmitters.

Turning now to FIG. 4, there is shown an exemplary block diagram of the TC 10. The TC 10 may be embodied using conventional transmitter architecture for DOCSIS® 3.0 compliant cable modems as known in the art. It includes a plurality of upstream transmitters 31, each capable of transforming an input sequence of data packets into an upstream RF signal for transmitting over an upstream channel. Output signals from the transmitters 31 are combined into a single RF output signal by an RF combiner 36.

A DOCSIS 3.0 compatible upstream transmitter 31 typically includes at its input an MPEG/DOCSIS encoder 35, followed by a QAM modulator 33, which is in turn followed by a digital to analog converter (DAC) 32. A digital frequency synthesizer 34 supplies the QAM modulator 33 with an RF carrier at a requested channel center frequency as specified by the controller 200. In another embodiment, the digital frequency synthesizer 34 may supply the QAM modulator 33 with an IF carrier, in which case the QAM modulator may be followed by a digital up converter (DUC) as known in the art.

DOCSIS® 3.0 specifies that up to four upstream channels could be present as a bonded DOCSIS channel group, requiring thus at least 4 transmitters 31. The maximum number of bonded channels in the upstream is likely to increase in future standards, necessitating an even greater number of the constituent transmitters 31.

During normal operation of the MCCM 100, the number of bonded upstream channels at the output of the TC 10 at any particular moment depends on current customer requirements for the upstream bandwidth. Most of the time, the amount of information that is being transmitted from the CPE 6 upstream does not require the maximum upstream throughput of the MCCM 100, so that one or more of the transmitters 31 may be idle for a relatively long time periods, and may be made available for upstream measurements, wherein the idle transmitter or transmitters 31 generate test signals having a central frequency and a modulation format set by the controller 200 in communication with the CMC 7. This test signal is then received and analyzed by the UMS 9. To avoid impacting customer service, in one embodiment the central frequency of the test signal generated by the idle transmitter is set outside of the upstream DOCSIS channel or channels that are currently allocated to the MCCM 100 to support customer traffic.

Figure 5:
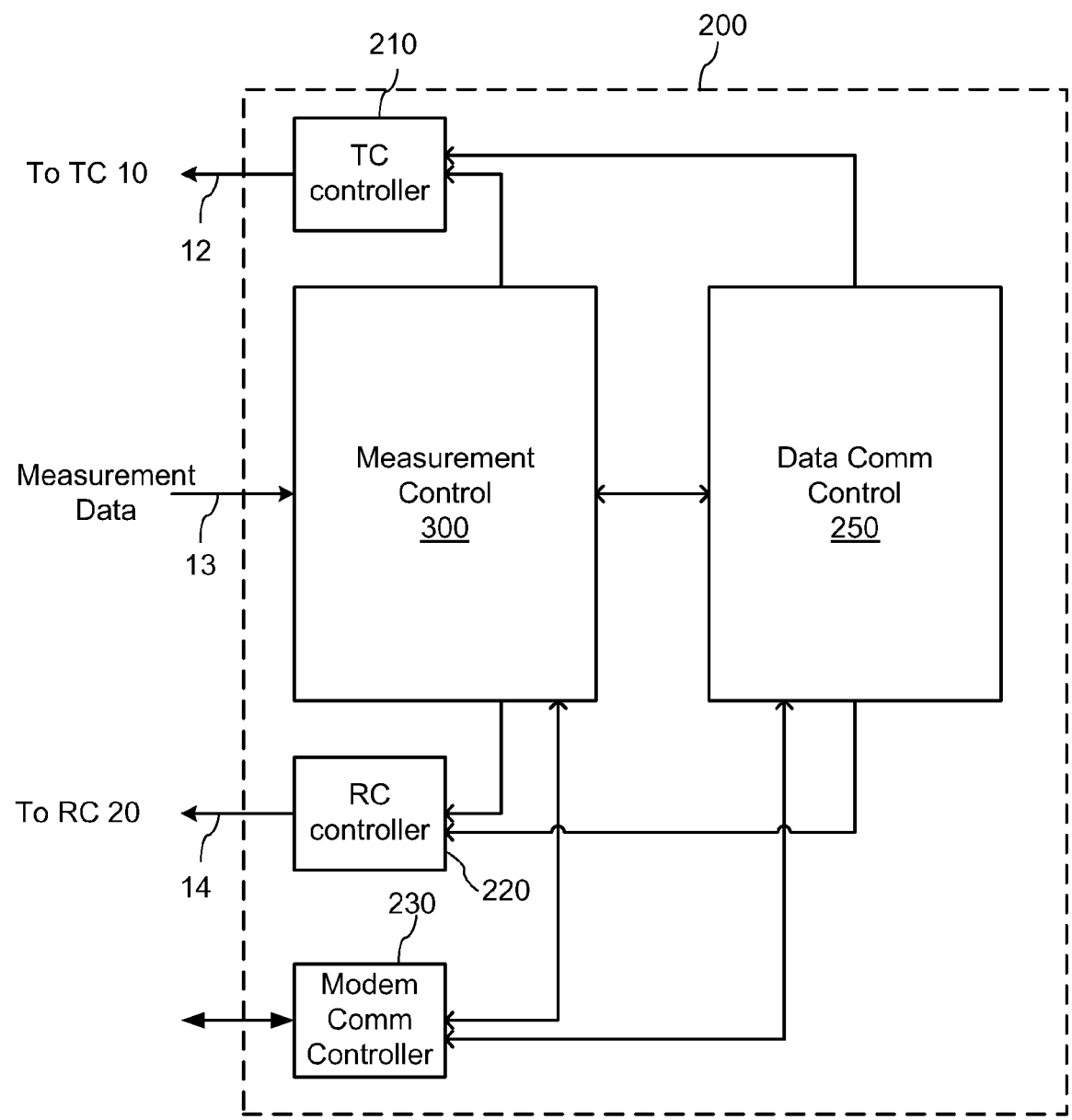
FIG. 5 is a schematic block diagram of a modem controller incorporating measurement control logic.

With reference to FIG. 5, there is illustrated a partial functional block diagram of the MCCM controller 200 in accordance with an embodiment of the present invention. Functional elements involved in processing of the customer data flow to and from the data port 80 are not illustrated in this figure, as they are well known in the art.

As shown in FIG. 5, the modem controller 200 includes a data communication controller (DCC) 250, a TC controller (TCC) 210, an RC controller (RCC) 220, a modem communication controller (MCC) 230, and a modem measurement controller 300, also referred to herein as measurement control logic (MCL) 300. Each block shown in this figure is a functional block that can be implemented in software, firmware, hardware logic, or any combination thereof. In the context of the present application, the term 'software' includes firmware. The hardware logic, if used, can be in the form of programmable hardware logic, such as that defined in an FPGA, and non-programmable electronic circuits, e.g. ASIC.

The DCC 250 provides data communication control functions for supporting normal modem operation as known in the art, including but not limited to those related to allocation of transmitters 31 and receivers 21 for data communications, channel bonding, and routing of the upstream and downstream data packets to or from the transmitters and receivers currently designated for data communications. The MCC 230 controls service-level communications of the MCCM 100 with the CMTS 3, such as upstream and downstream channel allocation and channel bonding, including communicating channel bonding assignments from the CMTS to the DCC 250, among others. The TCC 210 and the RCC 220 controls settings of various blocks of the TC 31 and the RC 21, respectively, including the selection of the upstream and downstream channels and modulation formats for designated receivers and transmitters in response to control signals from the DCC 250. Functional blocks 210, 220, 230 and 250 can be found in prior art DOCSIC® 3.0 compatible cable modems.

The present invention further provides the MCL 300 within the modem controller 200 for supporting network measurement and monitoring functionality of the MCCM 100. Functions of the MCL 300 may include a) identifying which of the receivers 21 and transmitters 31 are currently idle and are available for measurements, b) conducting the measurements using the currently idle receivers and transmitters in according with a measurement plan, and c) optionally receiving, processing and/or storing measurement data 13 from the RC 20. For this purpose, the MCL 300 is operatively coupled to one or both of the TCC 210 and RCC 220 for controlling the currently idle receivers 21 or transmitters 31 during the measurement, which may include setting the respective central frequencies, modulation formats, tuner bandwidth, receiver filter bandwidth, transmit power, etc. The MCL 300 may communicate with the CMC 7 or the LMC 8 via the MCC 230 for different purposes, including one or more of the following: i) to obtain a measurement plan, ii) to receive a measurement initiating signal, iii) to transmit the measurement data, and iv) to transmit modem's measurement capability list, including identifying which of the receivers 21 and transmitters 31 are currently idle. The MCL 300 may also receive information identifying the currently idle receivers 21 and/or transmitters 31 from the DCC 250, or directly from the TCC 210 and RCC 220. In one embodiment, the MCL 300 is implemented in software that is stored in memory 70 and is executed by processor 50.

Figure 6:
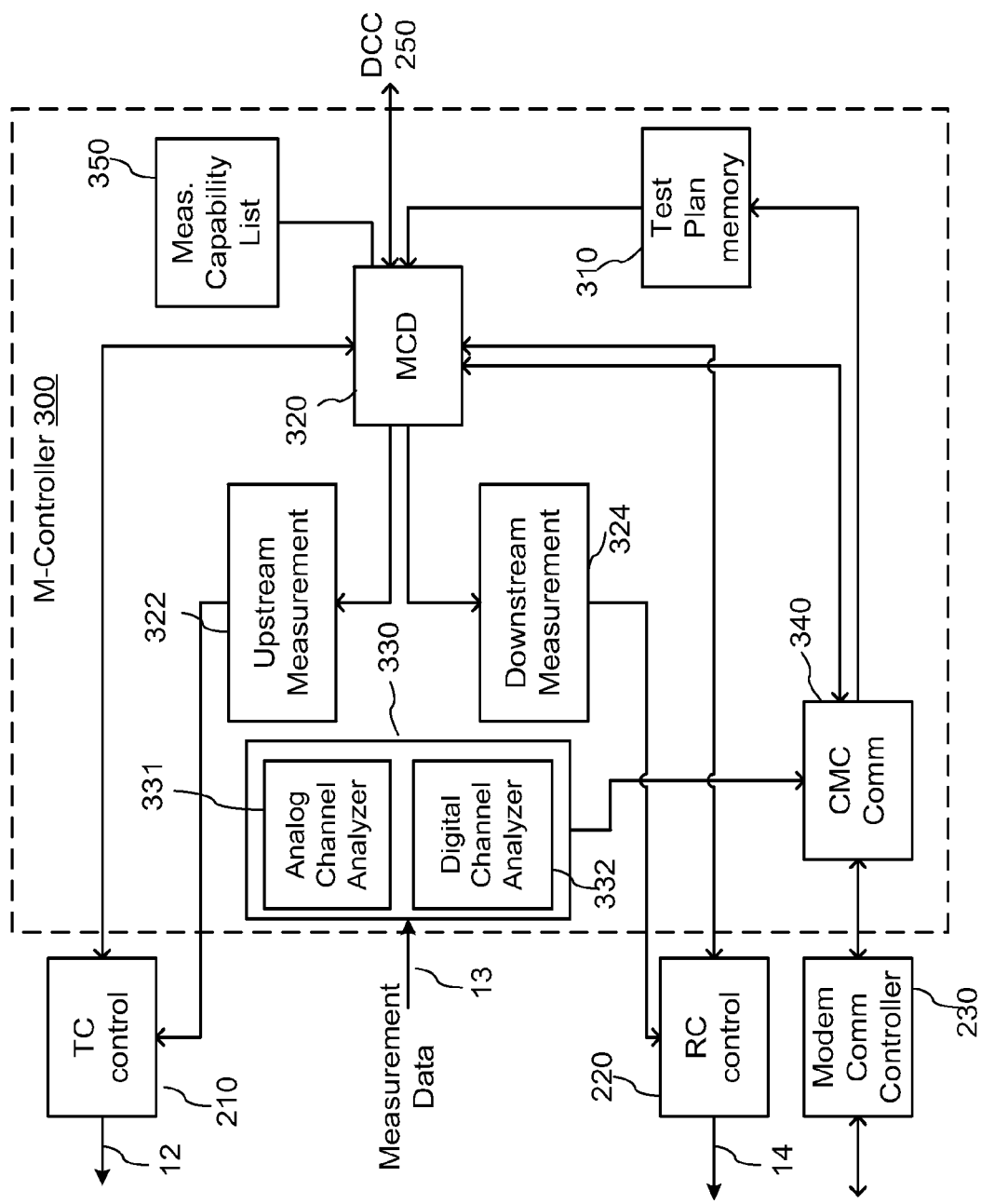
FIG. 6 is a schematic block diagram of the measurement control logic of the modem controller.

Turning now to FIG. 6, in one embodiment the MCL 300 includes the following functional blocks: a measurement capability detector (MCD) 320, a test plan memory 310, an optional measurement data analyzer 330, an upstream measurement logic (UML) 322 and/or a downstream measurement logic (DML) 324, and an optional MC communication logic 340. The measurement data analyzer 330 may include an analog channel analyzer (ACA) 331, and a digital channel analyzer (DCA) 332. Various functional units shown as blocks in FIG. 6 can be embodied in software, firmware, hardware logic, or any combination thereof, and may include computer-readable memory. In one embodiment, the ACA 331 and DCA 332 are implemented in software, and embody various known in the art data processing algorithms for analysis digitized analog signals, such as analog CATV, and digital QAM-modulated signals, such as DOCSIS and DTV signals, as described hereinbelow in further detail by way of example.

In operation, the MCD 320 may obtain a measurement plan either from the test plan memory 310 or directly from the external CMC or LMC via the MCC 230 and the MC communication logic 340, and determines if the required measurement capability, such as idle receivers and/or transmitters, is currently available, for example by querying the TCC 210 and/or the RCC 220, or by querying the DCC 250.

In one embodiment of the invention, the MCD 320 builds a measurement capability list 350 for the MCCM 100. This may be accomplished, for example, using a set of steps illustrated in FIG. 7.

The UML 322 and the DML 324 each incorporate measurement algorithms, for example embodied in software, for conducting a variety of measurements such as those indicated hereinabove with reference to various elements of the RC 20 and TC 10. In operation, they generate control signals for controlling the currently idle receivers and/or transmitters for performing requested measurements in accordance with the measurement plan. The optional data analyzer 330 receives the measurement data 13 from the RC 20, either directly or via the FIFO 40, optionally analyzes these data and/or performs a post-processing thereof as required using data processing algorithms provided with the measurement software, stores results of the analysis and/or raw measurement data in memory and communicates them to the EMC using the MC communication logic 340. The UML 322 may also include test signal generating logic or circuit, which may be implemented for example in software or firmware, for generating test signals such as specific bit patterns for testing upstream channels.

Figure 7:
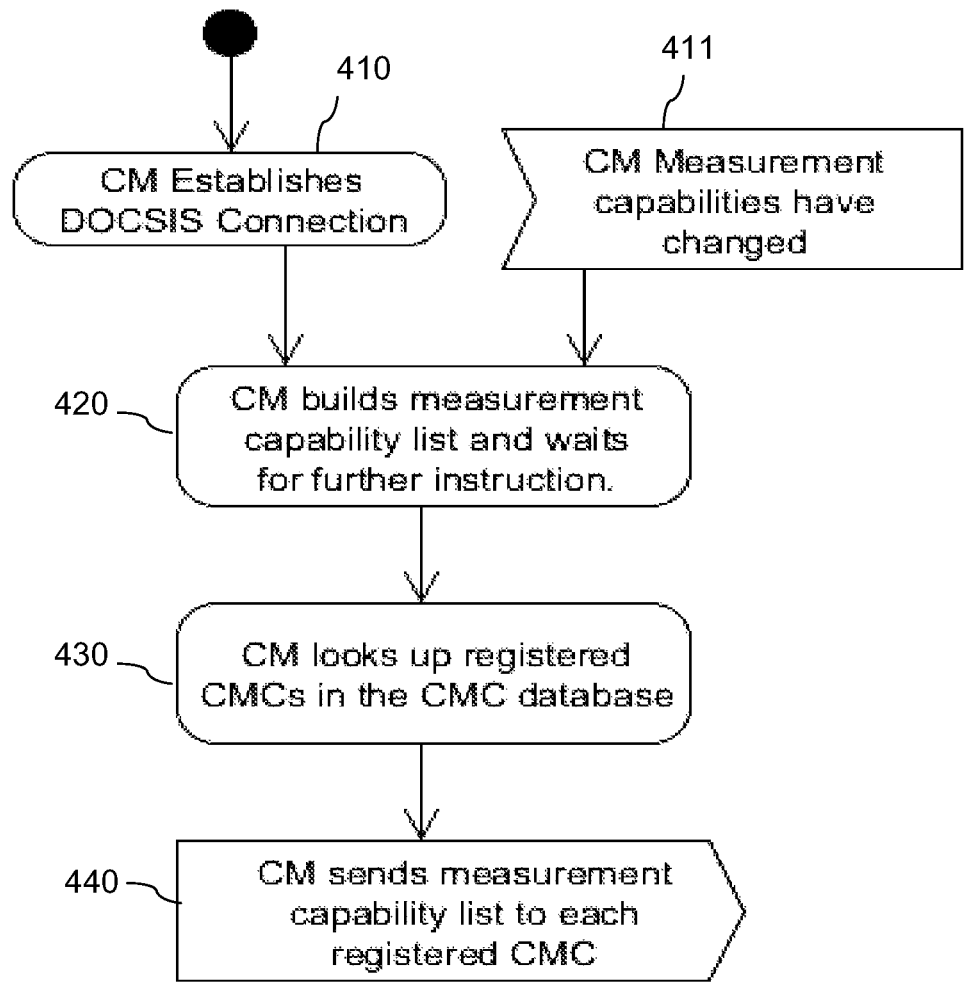
FIG. 7 is a flowchart of a process of building a measurement capability list according to an embodiment of the invention.

Turning now to FIG. 7, there is illustrated an exemplary sequence of steps in which the MCCM 100 may build and transmit a measurement capability list 350. Several events may cause the MCCM 100 to build or update a measurement capability list. A first event 410 is a modem start-up or re-booting when the MCCM 100 establishes a DOCSIS connection with the CMTS 3. A second event 411 is a change in the cable modem's measurement capabilities, for example when the CMTS 3 orders the MCCM 100 to change its bonding group. The MCCM 100 may also build a new measurement capability list 350 at a request by an external MC, such as the CMC 7 or the LMC 8 that is connected to the modem locally. In one embodiment, upon receiving a request from the CMC 7, MCCM 100 verifies its credentials, such as a proper security certificate or its registration with a secure CMC database.

Once the MCL 300 determines that a measurement capability list needs to be built, in step 420 the MCD 320 examines the modem's current configuration to determine how many downstream receivers and upstream transmitters are idle, i.e. not being actively used by the established DOCSIS connections serving customer data communications. Provided there are resources available, the MCD 320 may then examine its measurement software configuration to determine which measurements could be supported given the available hardware resources. The modem then compiles the measurement capability list 350, which may also include information related to modem's hardware resources that have bearing on measurement capabilities, such as CM chipset model. By way of example, capability of the MCCM 100 to perform a specific measurement such as Carrier to Noise Ratio (CNR) may depend on the receiver noise sensitivity, which depends upon the CM chipset of the MCCM 100. If the MCL 300 maintains a database of all registered CMCs that have the right of access to the MCCM 100, the MCL 300 in step 430 looks up registered CMCs in a CMC database. In step 440, the measurement capability list 350 is provided to the CMC communication logic 340, which sends it to one or more CMCs that are registered with the MCCM 100, for example via a DOCSIS connection to the CMTS 3 using an IP protocol.

In one embodiment, the building of a measurement capability list 350 by the MCCM 100 may include one or more of the following steps or processes.

The MCCM 100 examines its hardware configuration to determine how many downstream receivers 21 are not being used by the DOCSIS connection. If at least one downstream receiver is idle, then the MCCM 100 has resources available for measurement of non-DOCSIS downstream channels.

The MCCM 100 examines its hardware configuration to determine how many upstream transmitters 31 are not being used. If at least one upstream transmitter is idle, then the MCCM 100 has resources available for transmitting test signals in the upstream frequency band, preferably at frequencies outside of the DOCSIS upstream channels.

The MCCM 100 examines its software configuration to determine, which measurement capabilities it can support given the set of available downstream receivers and transmitters.

After the MCCM 100 has constructed its measurement capability list 350, it sends it to the CMC 7 so that the CMC 7 can generate an appropriate measurement plan for the modem 100.

The measurement capabilities of the MCCM 100 may be divided into the following categories:

Service Level Test Capabilities—These measurement capabilities are available whenever the MCCM 100 has successfully established a DOCSIS connection with the CMTS 7. The modem does not need any idle downstream receivers or upstream transmitters to support the following capabilities: i) Downstream throughput measurement, ii) Upstream throughput measurement, iii) VoIPCheck, iv) Upstream Packet loss, v) Downstream Packet loss, vi) Network connectivity (ping). Measurement algorithms for performing these measurements are known in the art.

Analog Measurement Capabilities—these measurement capabilities are available if at least one downstream receiver 21 is idle and if the MCCM 100 hardware and measurement software can support them; examples of analog signal parameters to be measured include Video and Audio Carrier Level, Hum, Carrier to Noise Ratio (CNR). In one aspect of the present invention, measurement of these parameters involves tuning the idle receiver to the analog channel to be measured, and reading digitized analog signal from the output of the DDC of the idle receiver. Signal processing algorithms for performing these measurements based on the digitized signal are known in the art.

Digital Measurement Capabilities—these measurement capabilities are available provided that at least one downstream receiver 21 is idle and the hardware and measurement software of the MCCM 100 can support them. By way of example, a portion of the measurement capability list 350 pertaining to the Digital Measurement Capabilities may indicate whether the MCCM 100 is capable of performing the following non-exclusive list of digital measurements: Carrier level, MER, BER, DQI™, Ingress under the carrier, IQ sampling, Errored Seconds, Digital Hum. Here IQ sampling means capturing pairs of I and Q amplitudes at symbol times from the output of the DDC 22 in order to display or analyze a QAM constellation. The values at the symbol time may be interpolated between values taken at periodic sample times. Errored Seconds is an error performance indicator that refers to a counter of one-second intervals in which uncorrected bit errors are detected in the output of QAM demodulator, and which can be obtained by querying the MPEG/DOCSIS decoder 24. Digital Hum could be measured, for example, by querying a register associated with an AGC of the QAM demodulator using techniques disclosed in U.S. Patent Application 2009/0185037 to Shi, et al, which is incorporated herein by reference.

Digital Signal Type Capabilities—These capabilities indicate what types of digital signals can be measured by the MCCM 100. By way of example, a portion of the measurement capability list 350 pertaining to the Digital Signal Type Capabilities may indicate whether the MCCM 100 is capable of measuring the following signal types: i) MPEG-encoded data with high levels of interleaving characteristic for digital TV but not for DOCSIS channels; ii) Supported QAM signal type, such as QAM 64, 128, 256, etc; iii) Supported Annex signal type, such as Annex A, Annex B, etc.; iv) Supported frequency ranges, such as 85-1000 MHz. Measurement algorithms for performing these measurements by querying receiver blocks 22-24 are known in the art.

Transmit Capabilities—These capabilities indicate what types of signals could be transmitted by the MCCM 100 for use during upstream measurement tests. By way of example, a portion of the measurement capability list 350 pertaining to the Transmit Capabilities may indicate whether the MCCM 100 is capable of transmitting the following signal types: i) Carrier wave, ii) QAM (16, 32, 64, etc), iii) Supported carrier frequency ranges (e.g. 5-85 MHz).

After sending the measurement capability list 350 to the one or more registered CMCs, for example the CMC 7, the modem may wait for a measurement plan from the CMC 7. Alternatively, the modem may have a measurement plan previously saved in the test plan memory 310, in which case the modem may set a timer indicating when to start executing the measurement plan.

Figure 8:
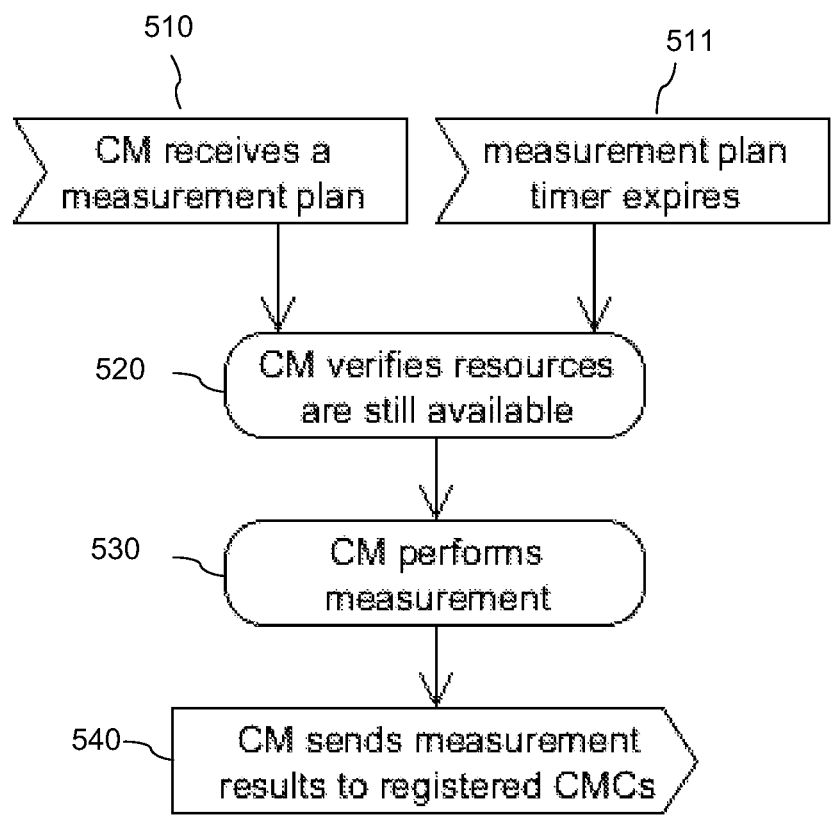
FIG. 8 is a flowchart of a measurement process at a measurement-capable cable modem according to an embodiment of the invention.

Referring now to FIG. 8, there is shown a flowchart that outlines one embodiment of a process of performing a measurement. The measurement may be initiated by receiving a new measurement plan from the CMC 7 or the LMC 8 in step 510, or at scheduled time instances or time intervals, or when a measurement plan timer expires in step 511. Once the modem has determined that it needs to start a measurement, in step 520 the MCD 320 may verify whether the necessary resources are still available. If they are not available, the measurement is not performed. In one embodiment, the modem may change its bonding group in communication with the CMTS 3 so as to free the required hardware resources, i.e. one or more of the receivers 21 and/or transmitters 31, for measurements without affecting the ability of the MCCM 100 to perform customer services, i.e. to support data traffic between the network and the CPE 6. If the required resources are available, in step 530 the MCL 300 executes the measurement plan to perform the requested measurements according to the provided plan parameters in cooperation with the idle receivers and/or transmitters. Upon completion of the measurement plan, the MCCM 100 may send a measurement report to the CMC 7 in step 540. After sending the measurement results to the CMC 7, the MCL 300 may wait for the measurement timer to expire, for the reception of a new measurement plan, or for the measurement capabilities to change.

Figure 9:
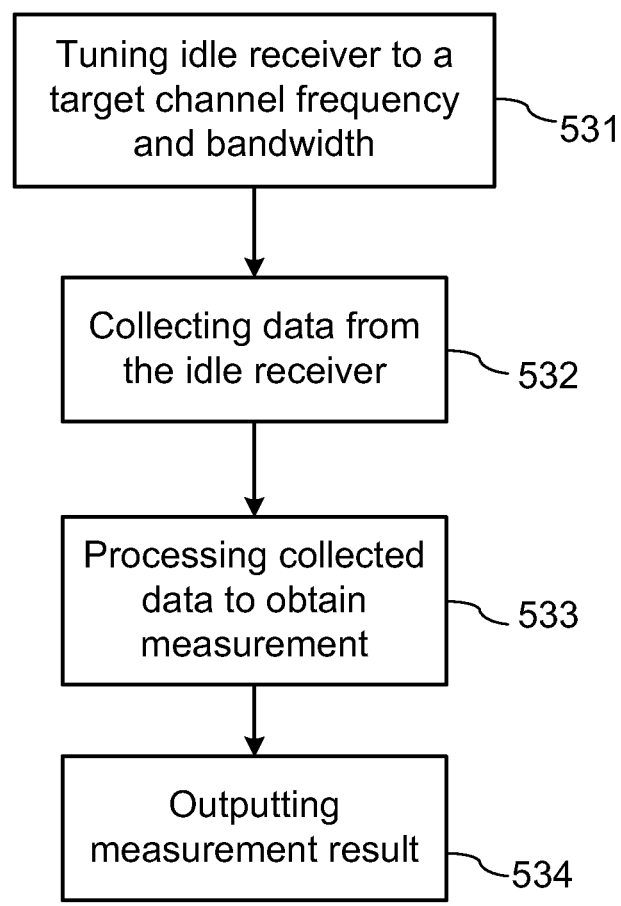
FIG. 9 is a flowchart of a downstream channel measurement at a measurement-capable cable modem according to an embodiment of the invention.

With reference to FIG. 9, an embodiment of the measurement process 530 executed by the measurement controller 300 of the MCCM 100 may start with step 531, wherein the idle receiver, i.e. one of the receivers 21 that is not currently allocated for receiving a DOCSIS channel for supporting customer services, is tuned in frequency and bandwidth to a target channel. The term 'target channel' is used herein a channel to be measured in accordance with the received measurement plan. The target channel frequency may be outside of frequency ranges of the downstream channels that are currently allocated for the data communications between the cable network and the CPE 6 that is connected to the MCCM 100. With reference to FIG. 6, this step may include the RC control logic 220, following a corresponding command from the DML 324, sending an RC control signal 14 to the idle receiver 21 to tune its operation parameters as required. This may also include setting the central frequency and the sampling rate of the DDC 22 of the idle receiver 21 to the target channel's central frequency and a desired sampling rate, for example in accordance with the bandwidth of the target channel to be measured. The target channel to be measured may be a DOCSIS channel, a DTV channel, an analog TV channel, or generally any channel that may be present in the cable network 1 and is within the receiver frequency range of the MCCM 100. In step 532, the measurement controller 300 queries the idle receiver 21 and/or the FIFO buffer 40 to collect data from the idle receiver 21, i.e. from any one or more of the receiver data processing blocks 22, 23 or 24 shown in FIG. 3. In step 533, the measurement controller 300 processes the collected data to obtain a measurement result in accordance with the measurement plan, and outputs this measurement result in step 534 for storing in modem's memory and/or for communicating to the CMC 7, or LMC 8, using the CMC communication logic 340 and the modem communication controller 230.

Figure 10:
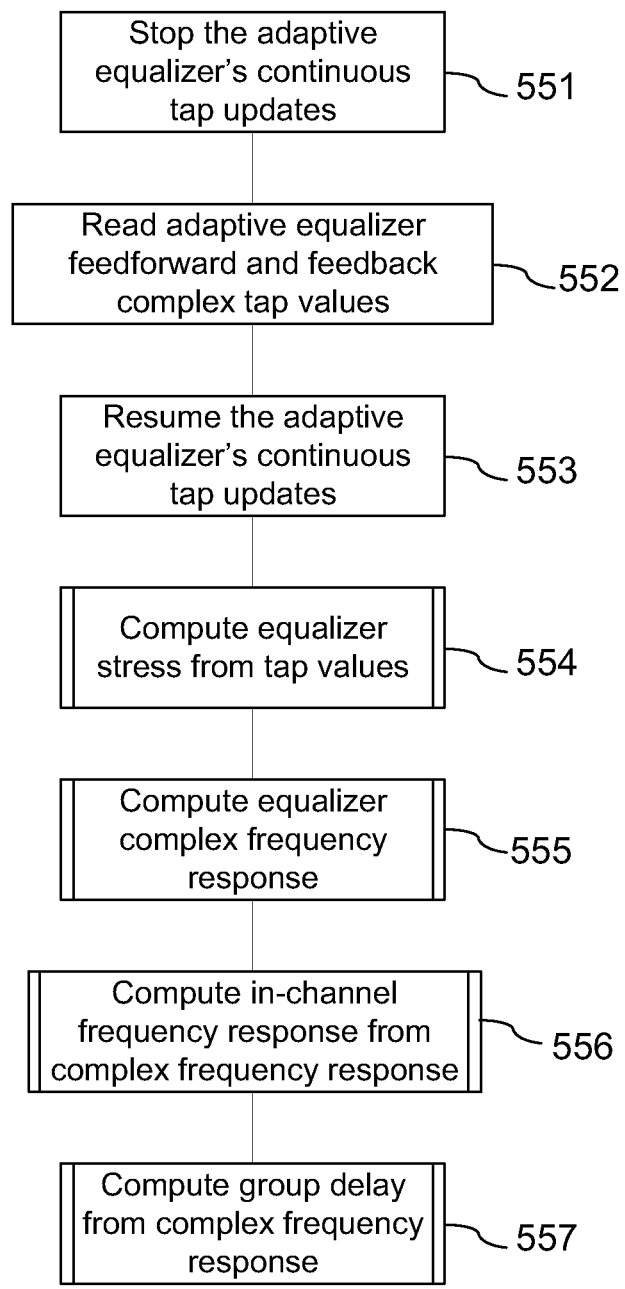
FIG. 10 is a flowchart of a downstream channel measurement based on assessing demodulator's equalizer tap values.
Figure 11:
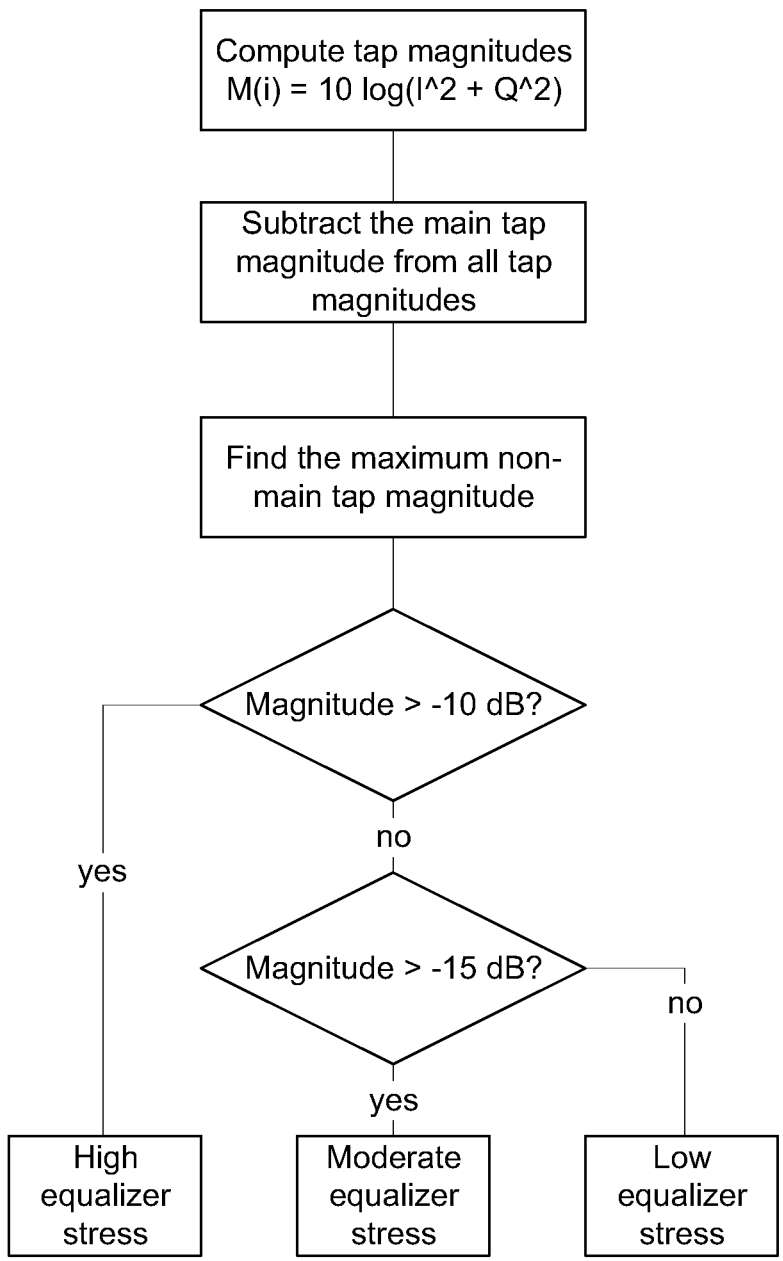
FIG. 11 is a flowchart of computing equalizer stress from the demodulator's equalizer tap values.
Figure 12:
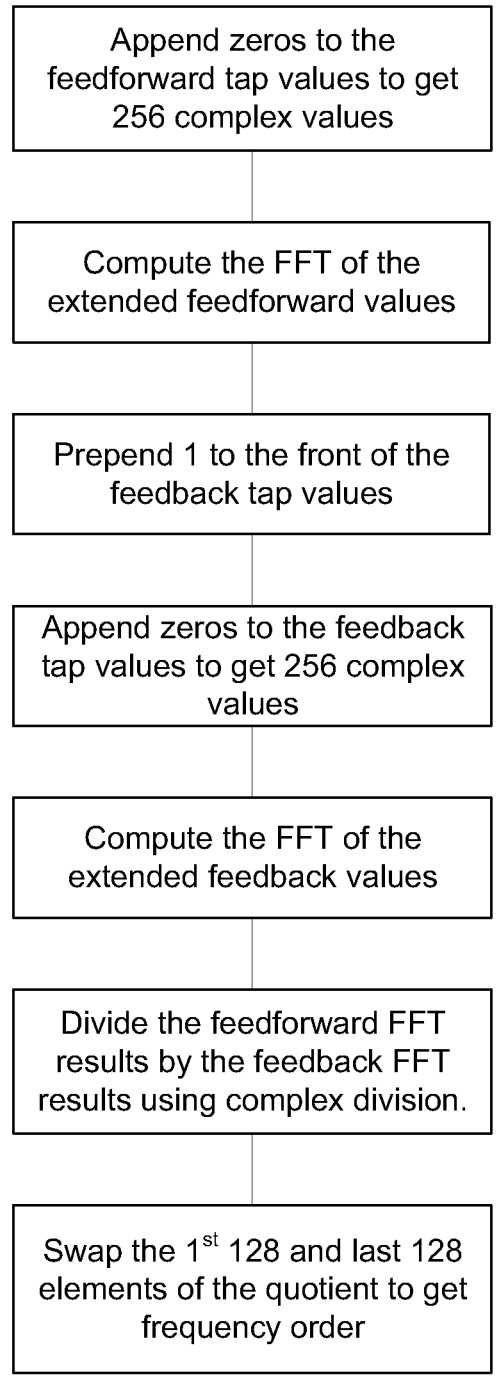
FIG. 12 is a flowchart of computing equalizer complex frequency response from the demodulator's equalizer tap values.
Figure 13:
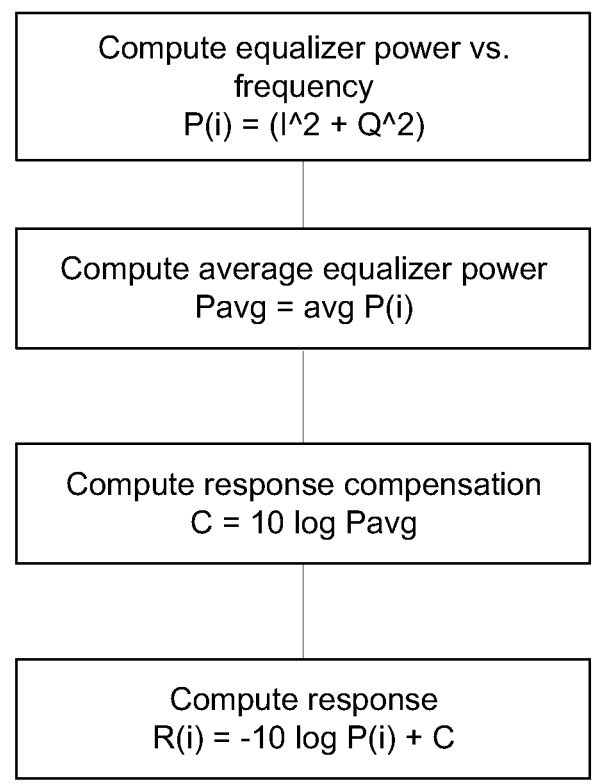
FIG. 13 is a flowchart of computing in-channel frequency response from the equalizer's complex frequency response.
Figure 14:
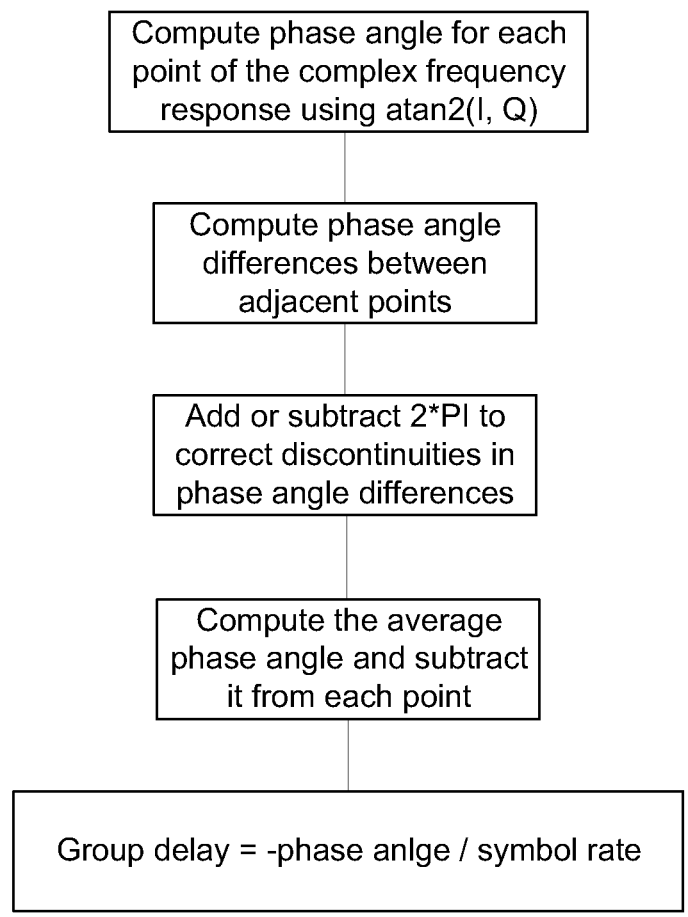
FIG. 14 is a flowchart of computing group delay from the equalizer's complex frequency response.

With reference to FIG. 10, there is schematically illustrated an exemplary measurement process for measurements on digital channels using QAM, such as a DOCSIS channel that is allocated by the CMTS 3 to another customer and thus is outside of any DOCSIS bonded channel group of the MCCM 100 performing the measurement, or a DTV channel, or a DOCSIS channel that is in use by the MCCM 100. As in the process of FIG. 9, the measurement starts with tuning the idle receiver to the target digital channel, for example as described hereinabove with reference to FIG. 9, step 531. After the tuning is completed, the DML 324 of the measurement controller 300 uses the RC control logic 220 to direct the adaptive equalizer (EQ) of the QAM demodulator 23 to first stop continuous updates of the EQ taps in step 551, and then resume the EQ tap updates in step 553. While the EQ tap updates are stopped, in step 552 the measurement data analyzer 330 reads EQ feedforward and feedback complex tap values, saving them for example in RAM 60, and then processes these values in steps 554-557, for example using suitable known in the art data processing methods implemented as software routines or modules, to obtain channel characteristics as desired or requested by the measurement plan. In the particular embodiment illustrated in FIG. 10, these include: computing EQ stress from the collected EQ tap values in step 554, computing an EQ complex frequency response in step 555, computing in-channel frequency response from the EQ complex frequency response in step 556, and computing the group delay from the EQ complex frequency response in step 557. Suitable methods to compute all these characteristics from the complex EQ tap values are known in the art; flowcharts shown in FIGS. 11-14 illustrate exemplary embodiments of these methods.

Figure 15:
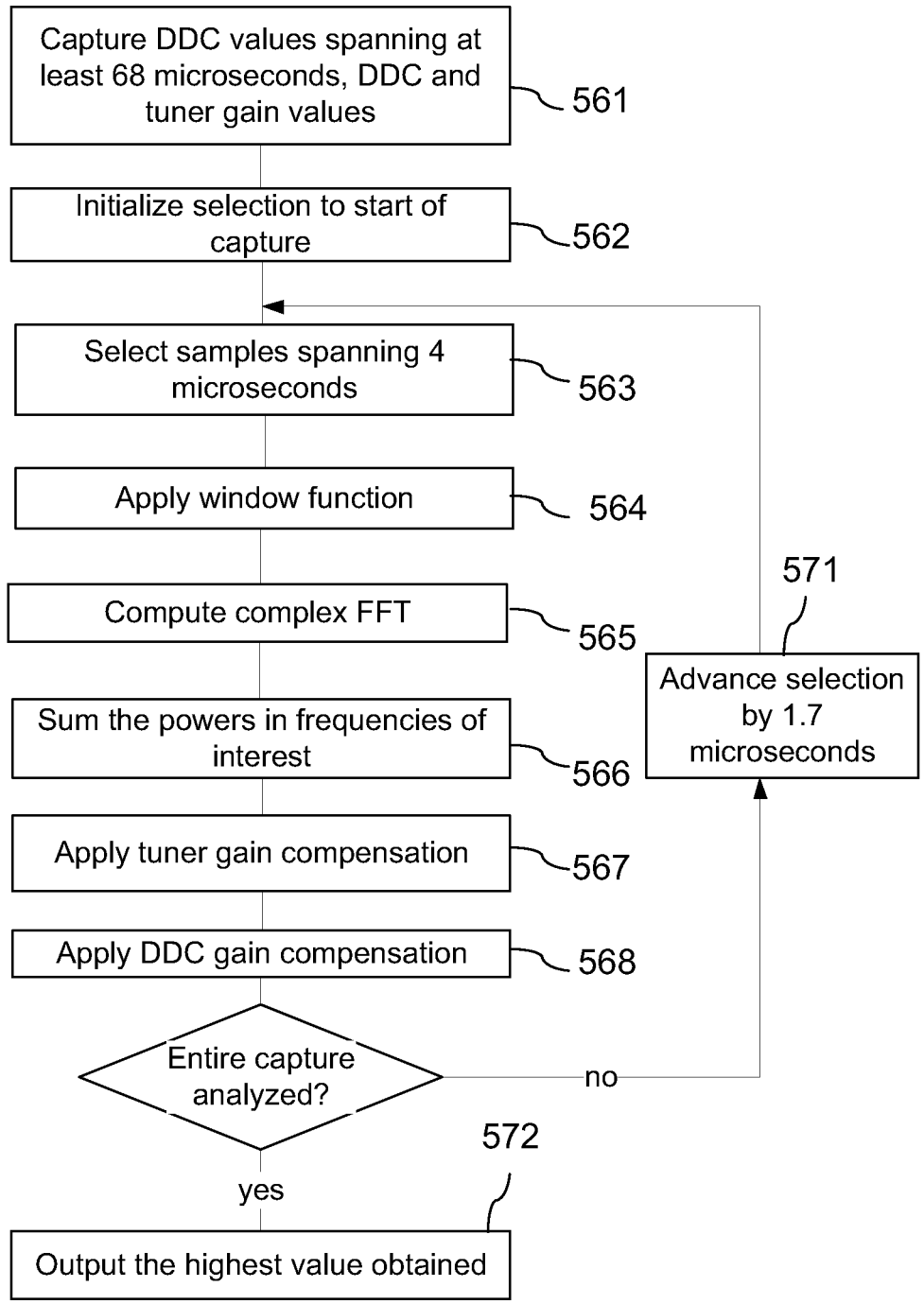
FIG. 15 is a flowchart of an exemplary process of measuring an analog video or audio signal using an idle receiver according to an embodiment of the invention.

With reference to FIG. 15, there is schematically illustrated another exemplary measurement process that may be performed by the MCCM 100 using the DML 324 of the measurement controller 300. In this embodiment, the measurement plan includes 'Level' measurement on an analog TV channel, i.e. the measurement of the signal power in the analog TV channel. As in the process of FIG. 9, the measurement starts with tuning the idle receiver to the target digital channel, for example as described hereinabove with reference to FIG. 9, step 531, by sending the control signal 14 to the DDC 22 of the idle receiver to tune to the central frequency of the target analog TV channel. After the tuning is completed, in step 561 the measurement data analyzer 330 captures a sequence of I and Q samples of a suitable length from the output of the DDC 22 of the idle receiver and saves it in memory, optionally using the FIFO 40 as a buffer to collect the I and Q sequence if the DDC sampling rate exceeds the processing speed of the processor 50. By way of example, in one embodiment the I and Q samples are collected for a duration of time sufficient to capture a horizontal sync pulse period and duration, for example for at least 68 microseconds for analog TV signals in North America. Simultaneously, gain registers of the wideband tuner 26, the ADC 25 and the DDC 22 may be queried by the modem measurement controller 300 to capture their respective gain values.

Next, in steps 562-566 the stored sequence of the DDC samples is processed in smaller blocks using an FFT, each time advancing the sample selection window by a desired time step t as indicated at 571, to sample the power of the received video signal at the desired time interval t, which may be selected so that there would be at least one interval containing the whole sync pulse within the sample selection window. By way of example, for analog TV signals in North America t may be selected to be 1.7 microseconds. The signal power at each step is computed by summing up spectral power values for FFT frequencies within the spectral width of the analog TV channel as indicated in FIG. 15 at step 566, and then using the gain coefficients read by the measurement controller 300 from the gain registers of the wideband tuner 26, the optional ADC 25 and the DDC 22 of the idle receiver 21 to estimate the signal power in the target analog TV channel at the cable port of the MCCM 100. In step 572, the sampled signal power values, or a maximum value thereof, are output for storing in memory and/or communicating to the external measurement controller, i.e. CMC 7 or LMC 8. By way of example, for analog TV signals in North America, FFT frequencies to be summed for computing the video power include the video carrier frequency, 1.75 MHz below the channel center frequency, and should span a bandwidth of about 300-500 kHz.

The aforedescribed procedure is only one example of using the MCCM 100 to perform Carrier Level measurement on an analog TV channel; one skilled in the art will appreciate that other implementations of the Level measurement are also possible, as well as measuring other characteristics of the received analog TV signal using the DDC output, such as for example Hum and CNR.

The sequence of steps illustrated in FIG. 15 may also be used for performing Signal Level measurements on an audio component of the target analog TV channel, for example using time blocks t for FFT from 1.7 to 8 microseconds. For analog signals in North America, the audio power may be measured at the audio carrier frequency, 2.75 MHz above the channel center frequency, and should also span a bandwidth of about 300-500 kHz. For audio level measurement, the last step 572 in the flowchart of FIG. 15 may include outputting the average of the values obtained in step 568 instead of outputting the highest obtained value, due to the use of FM modulation for the audio channel in North America. In one embodiment, the video and audio levels can be obtained within a single process using a same FFT length, for example capturing the 68 microseconds of samples, performing the FFTs on windows advanced every 1.7 microseconds, computing both video and audio levels by selecting appropriate bins of the FFT output, and selecting the maximum video level and average audio level across all outputs.

In one embodiment, the CMC 7 may utilize an idle receiver 21 of the MCCM 100 and the DMS 128 to perform downstream spectral measurements, that is to measure the cable network transmission characteristics in dependence on channel frequencies, i.e. on channel per channel basis. In one possible implementation, the DMS 128 performs level measurements on DOCSIS downstream channels generated by the CMTS and/or the analog and digital TV channels generated by the CATV transmitters 129, and reports these measurements to the CMC 7. The MCCM 100, either at scheduled time intervals, upon specific events or as directed by the measurement plan obtained from CMC 7, utilizes the idle receiver 21 of the MCCM 100 to sequentially tune to a plurality of downstream channels as designated by the measurement plan, which may include DOCSIS channels, DTV channels and analog TV channels, and performs level measurements thereon, for example as described hereinabove with reference to FIG. 15, transmitting the results to the CMC 7. The CMC 7 then may then use the per-channel level measurements received from the MCCM 100 to compute the downstream frequency response of the cable link between the headend 5 and the particular customer premises, i.e. the amount of transmission loss from the headend 5 to the MCCM 100 performing the measurement, using the channel level readings obtained from the DMS 128 as baseline values.

In one embodiment, the CMC 7 may utilize an idle transmitter of the MCCM 100 and the UMS 9 for performing upstream measurements, such as measurements on upstream DOCSIS channels. The process of performing an upstream measurement may include generating by the TC controller 210 a control signal 12 to tune an idle transmitter 31 of the MCCM 100, i.e. one of the transmitters 31 that is not currently allocated for data communications with the CMTS 3 for providing customer services, to a target upstream channel, and to set the QAM modulator 33 of the idle transmitter 31 to the desired modulation format, for example as specified in the measurement plan. In one embodiment, the idle transmitter 31 may generate a steady unmodulated signal at a specified frequency and with a specified level, which is then transmitted to the headend 5 to be received and measured by the UMS 9. The idle transmitter 31 may transmit the test signal in any unused frequency band in order to verify that the headend 5 is able to receive signals from the point in the HFC network 1 at which the MCCM 100 is located and to measure the amount of signal loss between the test point and the headend. The UMS 9 may be embodied, for example, using an HFC return path monitoring system such as PathTrak™ system that is manufactured by JDSU Inc, and is described in the Path-Trak™ Product Brochure, JDSU, October 2009, which is available from the JDSU Inc. website and is incorporated herein by reference. The UMS 9 detects the upstream test signal and measures its level in order to estimate transmission loss. The UMS 9 may communicate results of measurements, such as Carrier level, to CMC 7 for the determination of the upstream signal loss between the MCCM 100 at customer premises and the headend 5.

The idle transmitter 31 may also transmit a steady modulated signal using any of the DOCSIS upstream modulation formats that are within the capability of the MCCM transmitters 31. In one embodiment, the UML 322 may incorporate a test pattern generator, such as a pseudo-random sequence (PRS) generator, which is then provided to the idle transmitter 31 as 'data' for upstream transmission using the specified modulation format. The data used for the test signal modulation may contain a modem identifier such as its MAC address. Upon receiving the modulated test signal, the UMS 9 may demodulate and use known in the art signal processing methods to measure various transmission performance parameters, such as Ingress under the carrier, In-channel frequency response, In-channel group delay and amplitude ripple, MER, BER, carrier level.

According to one embodiment of the invention, the MCCM 100 performs measurements in communication with an external MC, such as the CMC 7 or another CMC which may be located at one of the network nodes or elsewhere where an IP connection to the CMTS 3 is available. In one embodiment, the CMC 7 is a dedicated device that includes a specialized computer or a general purpose computer that includes memory wherein a central measurement control program is stored, and a processor for executing the central measurement control program, and which has networking capabilities including the capability of securely communicating with one or more CMTSs in the network, for example using the IP protocol.

Figure 16:
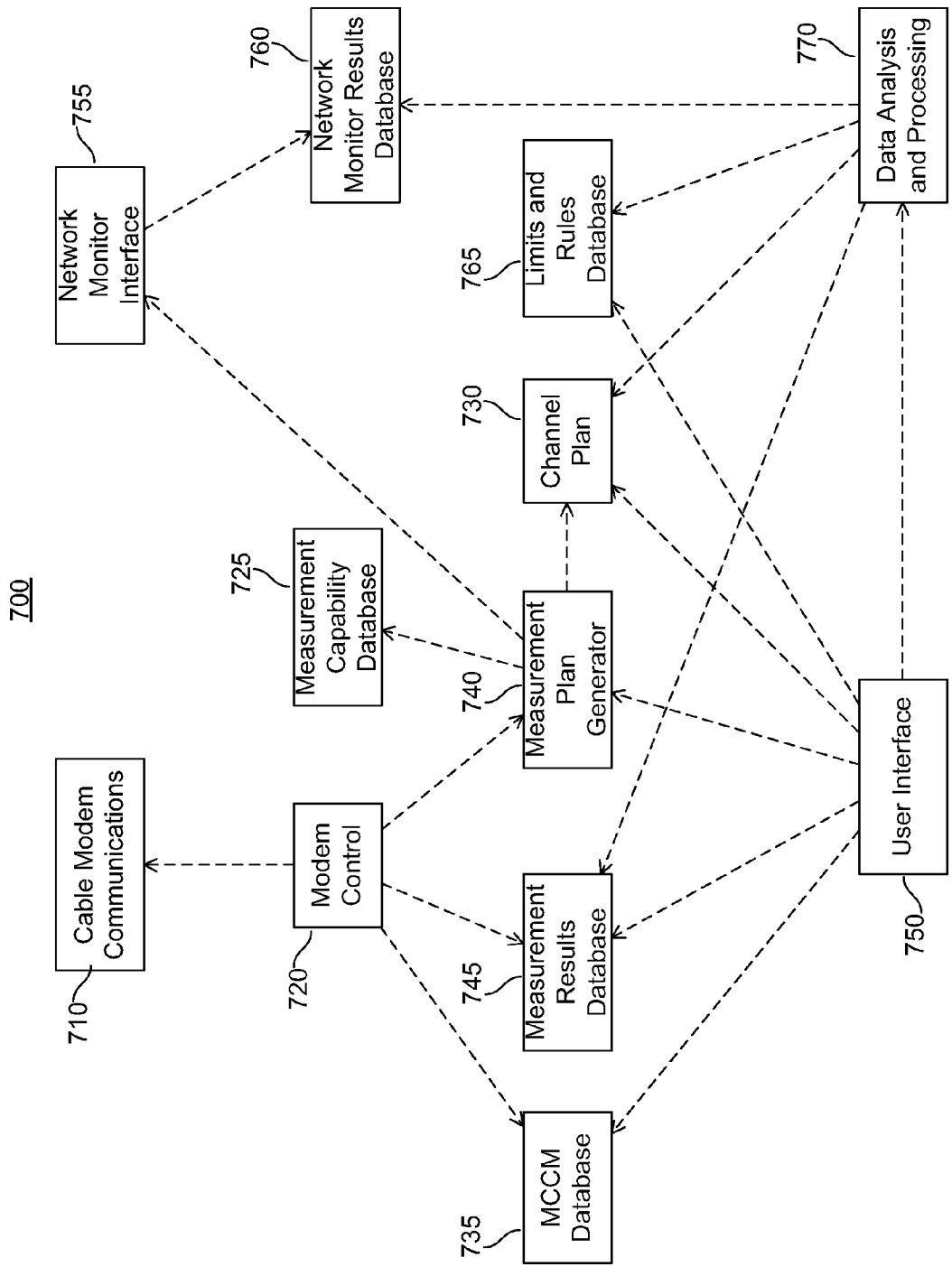
FIG. 16 is a schematic block diagram of a central measurement controller according to an embodiment of the invention.

With reference to FIG. 16, there is illustrated a functional block diagram of the CMC 7 in one embodiment thereof. The functional blocks shown in FIG. 16 may be implemented in software, hardware logic, or a combination thereof. In one embodiment, these functional blocks are software modules containing instructions stored in computer-readable memory and executed on a suitable computer, the computer having a network interface for connecting to the TCP/IP network 2, such as one or more network cards, and user interface devices such as a display, a keyboard, a mouse, and the like. As illustrated, the functional scheme of CMC 7 includes a CM communication block 710 for communication with the MCCMs 100, modem control block 720, an MCCM database 735 which contains a list of all MCCMs 100 known to CMC 7, a measurement results database 745 for storing results of measurements, a measurement plan generator 740, a channel plan database 730, a measurement capability database 725, a network monitor interface 755, a limits and rules database 765, a data analysis and processing module (DAAP) 770, and a user interface 750. The measurement capability database 725 contains measurement capability lists for each or some of the MCCMs 100 that are registered in the MCCM database 735. The measurement plan generator 740 generates the modem measurement plans for specific MCCM's 100 from the database 735 in accordance with the MCCMs measurement capabilities, optionally using information from the modem capability database 725. The channel plan database 730 contains a list of channels to be tested, for example as set by the measurement plan generator 740. The modem control block 720 forwards the modem measurement plans to the corresponding MCCMs 100, and controls storing and categorizing all measurement result files in the measurement result database 745. The user interface 750 provides access to the modem control module 720 to a user so that the user can configure measurements to be performed in the network.

The network monitor interface (755) communicates via the TCP/IP network 2 with the UMS 9 and DMS 128 if one or both of them are present in the network. By way of example, the measurement plan generator 740 may send measurement requests to UMS 9 and/or DMS 128, or query them to coordinate their respective measurement plans with the measurement plans being generated by CMC 7. Upon receiving measurement results from the UMS 9 and/or DMS 128, the network monitor interface 755 may store them in the network monitor results database (760).

The DAAP 770 coordinates, compares, processes and analyses measurement results from MCCMs 100 and from UMS 9 and/or DMS 128. By way of example, it may compute the downstream frequency response of the network paths connecting each MCCM 100 to the headend 5 by comparing the carrier levels measured at the MCCM 100 to those measured at the DMS 128, as described hereinabove. Similarly, it may compute the upstream frequency response by comparing the carrier levels for the upstream test signal generated at the MCCM 100 as described hereinabove to those measured at the UMS 9. It may also look for abnormally high or low signals at an individual MCCM 100 compared to all other MCCMs in the system or to pre-defined thresholds or limits. It may look for unexpected carrier level or frequency response changes. Based on the rules and limits configured by the user and stored in the Limits and Rules Database 765, it may generate error reports or alarms when a measurement falls outside of the acceptable limits.

Figure 17:
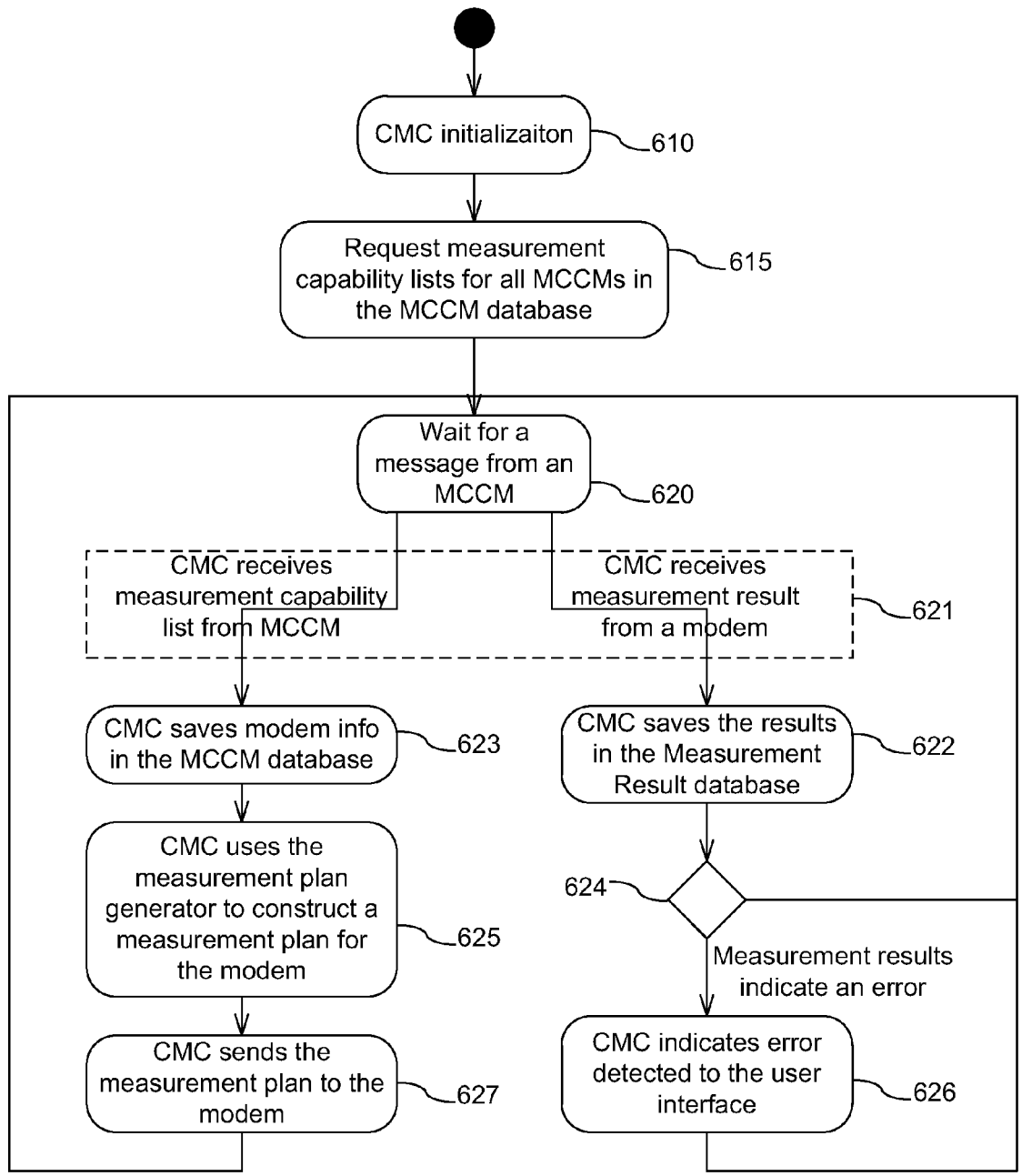
FIG. 17 is a flowchart illustrating a measurement control flow at the central measurement controller according to an embodiment of the invention.

With reference to FIG. 17, there is shown an exemplary control flow at the CMC 7. First, in step 610 the CMC starts up and performs an initialization procedure. This initialization procedure may include communicating with one or more CMTSs to build or update the MCCM database 735, which lists MCCMs 100 that the CMC 7 can communicate with. Upon completion of the initialization, in step 615 the CMC 7 may optionally send a request to get the measurement capability list 350 for each MCCM 100 listed in the MCCM database 735, and then waits for a message from the MCCMs in step 620. In one embodiment, the CMC 7 periodically updates the stored measurement capability information in communication with the MCCMs 100. In the context of this specification, 'periodically' relates to an action that is repeated from time to time, for example at scheduled time intervals, specific time instances and/or upon specific events, and does not necessarily imply repeating at a constant time interval.

In step 621, the CMC 7 receives a message from the MCCM 100 that contains the measurement capability list 350, or a measurement report. If the message contains the measurement capability list 350, the CMC 7 may optionally if required add the respective MCCM 100 to the MCCM database 735 in step 623, then it may use the measurement plan generator 740 and the received measurement capability list 350 to construct in step 625 a measurement plan for the MCCM 100, which is then sent to the MCCM 100 in step 627. By way of example, the measurement plan may include one or more of the following: measurement identifiers for each measurement to be performed, a channel plan specifying channels to be tested, intervals at which the measurements are to be repeated, and error thresholds.

In one embodiment, upon receiving the measurement plan, the MCCM 100 performs steps 520, 530 and 540 as described hereinabove with reference to FIG. 8, and optionally sets a timer specifying when to repeat the measurements as specified by the measurement plan. Upon expiration of the timer, the MCCM 100 may repeat these three steps.

If the message received by the CMC 7 from the MCCM 100 contains a measurement result or measurement data, the CMC 7 in step 622 may save these measurement results or data, after optional processing by DAAP module 770 as required, in the measurement result database 745. This would allow the data to be queried at a later date to look for trends or changes in the test results that might help indicate a network error. Step 622 may also include requesting measurement data from UMS 9 and/or DMS 128 that relate to the measurement data received from the MCCM 100, for example carrier level at source (CMTS 3 as measured by DMS 128) in the downstream channel measured by the MCCM 100, or carrier level at destination (CMTS 3 as measured by UMS 9) for the upstream test signal generated by the MCCM 100, and processing related measurement data from the MCCM 100, UMS 9 and DMS 128 to obtain a desired measurement, such as downstream or upstream signal loss for particular channels by way of example. Step 622 may also include displaying measurement results to the user. The CMC 7 may also analyze the measurement results for errors in step 624 using DAAP module 770. If a network error has been detected, the CMC 7 may generate an alarm indicating the error to a network operator.

In one embodiment, the CMC initialization procedure 610 may include one or more of the following: configuring the channel plan 730 with an input from the user, selecting a list of desired tests in dependence on the measurement capabilities of a modem, and initializing the measurement capability database 725 and measurement plan generator 740. The CMC initialization procedure may also include establishing communications with UMS 9 and obtaining a list of MCCMs 100 that are downstream from the UMS 9.

If the MCCM database 735 is empty on the very first CMC initialization, the CMC 7 skips step 615 of sending any requests to the cable modems to get their measurement capabilities.

When the MCCM 100 is powered on and successfully establishes a DOCSIS connection with the CMTS 3, the CMTS 3 may order the MCCM 100 to configure the DOCSIS connection such that the MCCM 100 has extra resources available for measurement.

In any particular cable network, different cable modems may be produced by different vendors and have different measurement capabilities. The measurement procedures described hereinabove with reference to FIGS. 7 and 17, which utilize measurement capability lists 350, is one example in which MCCMs 100 having different measurement capabilities can be used for performing a network-wide measurement. It will be appreciated however that the present invention may be implemented without transmitting the measurement capability list 350 to the CMC 7. For example, instead of maintaining the database 725 of measurement capability lists for a plurality of MCCMs, the CMC 7 may construct a single general measurement plan for a plurality of MCCMs in the network without knowing their particular measurement capabilities, and send it to all or some of the MCCMs in the network. In this scenario, each of the MCCMs may first verify whether it has the required resources available to perform the requested measurement before actually performing the measurement, and will perform the measurement to the extent that it has the required resources. In one embodiment, the MCCM 100 performs a resource availability verification procedure before performing any measurement, to ensure that the CMTS 3 has not changed the channel bonding group for load balancing activities, so that performing the measurement would have no substantial negative impact upon the customer's use of the cable modem as a communication device.

The invention has been described hereinabove with reference to specific embodiments that are given for the purpose of illustration only and are not meant to be limiting, and various other embodiments and modifications are possible without departing from the spirit and scope of the invention. An ordinary person skilled in the art would be able to construct such embodiments without undue experimentation in light of the present disclosure. It should also be understood that each of the preceding embodiments of the present invention may utilize a portion of another embodiment.

We claim:

1. A measurement-capable cable modem (MCCM) comprising:
   a cable port for connecting to a cable network;
   a data port for connecting to a customer premises equipment (CPE) for providing customer services;
   a plurality of transmitters coupled to the cable port for transmitting upstream digital communication signals from the CPE over one or more upstream channels of the cable network;
   a plurality of receivers coupled to the cable port for receiving downstream digital communication signals over one or more downstream channels of the cable network for communicating to the CPE; and,
   a modem controller coupled to the transmitters and the receivers for controlling thereof, wherein the modem controller is configured for tunably allocating at least one of the receivers and at least one of the transmitters for data communications between the cable network and the CPE, while leaving at least another one of the receivers as a currently idle receiver that is not allocated for the data communications, or leaving at least another one of the transmitters as a currently idle transmitter that is not allocated for the data communications;
   wherein the modem controller further comprises a measurement controller for utilizing the currently idle receiver or the currently idle transmitter to perform a network measurement.

2. An MCCM of claim 1, wherein the modem controller comprises:
   a processor coupled to the transmitters and the receivers for controlling thereof and for processing the upstream and downstream digital communication signals, and
   a program memory operably coupled to the processor and storing a set of instructions executable by the processor to identify the currently idle receiver or the currently idle transmitter, and to utilize the currently idle receiver or the currently idle transmitter to perform the network measurement.

3. An MCCM of claim 1, wherein the receivers comprise at least one signal processing device selected from the list of: analog to digital converter (ADC), Digital Down Converter (DDC), Quadrature Amplitude Modulation (QAM) demodulator, and wherein the at least one signal processing device is coupled to the controller for providing measurement data thereto.

4. An MCCM of claim 3, wherein the modem controller comprises a measurement capability detector (MCD) for identifying:
the currently idle receiver or the currently idle transmitter, and
downstream channels and upstream channels that are currently allocated for communication between the cable network and the CPE for providing the customer services.

5. An MCCM of claim 4, wherein the measurement controller comprises a downstream measurement logic for utilizing the currently idle receiver for measurements of a downstream signal that is received at a frequency outside of the downstream channels that are currently allocated for the data communications between the cable network and the CPE for providing the customer services.

6. An MCCM of claim 5, wherein the downstream measurement logic comprises means for performing measurements on at least one of: a digital TV channel, or an analog TV channel.

7. An MCCM of claim 4, wherein the measurement controller comprises an upstream measurement logic for generating a test signal, and for directing the currently idle transmitter to transmit the test signal over the cable network at a frequency outside of the currently allocated upstream channel or channels using the currently idle transmitter.

8. An MCCM of claim 4, wherein the modem controller comprises a communications controller for communicating available measurement capability of the MCCM and results of the network measurement to an external measurement controller.

9. An MCCM of claim 1 that complies with Data-Over-Cable Service Interface Specification (DOCSIS), and wherein the measurement controller comprises data processing means for measuring non-DOCSIS signals.

10. A method for monitoring a cable network comprising a network node, a cable modem termination system (CMTS) disposed at least in part at the network node, a cable modem (CM) disposed at a customer location for connecting to a customer premises equipment (CPE), and a cable link for connecting the CMTS to the CM for providing customer services, wherein the CM comprises a plurality of receivers for receiving downstream data communication signals from the CMTS over one or more downstream channels and a plurality of transmitters for transmitting upstream data communication signals over one or more upstream channels to the CMTS, the method comprising:
a) allocating at least one of the receivers and at least one of the transmitters to data communications between the CMTS and the CPE, leaving at least another one receiver or at least another one transmitter as a currently idle receiver or transmitter, respectively, that is not allocated to the data communications;
b) performing a network measurement using the currently idle receiver or the currently idle transmitter.

11. The method of claim 10, wherein step b) comprises at least one of:
generating an upstream test signal in a frequency band that is outside of upstream communication channel or channels that are currently allocated for communication between the CMTS and the CM for providing the customer services, or
measuring a downstream signal in a frequency band that is outside of downstream communication channel or channels that are currently allocated for communication between the CMTS and the CM for providing the customer services.

12. The method of claim 10, further comprising:
d) providing an external measurement controller (MC) in communication with the CM;
e) generating a measurement report at the CM, and
f) communicating the measurement report to the external MC.

13. The method of claim 12, wherein the external MC communicates with the CM via the CMTS.

14. The method of claim 12, further comprising:
receiving at the CM a request for the network measurement from the external MC, and
verifying that the requested network measurement is within a current measurement capability of the MC.

15. The method of claim 10, wherein the CM communicates the current measurement capability thereof to the external MC, and wherein the external MC communicates a request to perform the measurement to the CM in dependence upon the current measurement capability thereof.

16. The method of claim 10, further comprising providing an upstream monitoring system (UMS) at the network node, wherein step b) comprises: identifying the currently idle transmitter, generating by the CM an upstream test signal using the currently idle transmitter, and utilizing the UMS for receiving and characterizing the upstream test signal, for generating a UMS measurement report, and for communicating the UMS measurement report to the external MC using a data connection.

17. The method of claim 10, wherein the cable network comprises a plurality of CMs connected to the network node using a plurality of cable links for providing customer services at CM locations, each of the plurality of CMs comprising a plurality of receivers and a plurality of transmitters, the method further comprising providing an external MC in communication with each of the plurality of CMs;
the method comprising determining current measurement capabilities for each of the plurality of CMs, and performing step b) at one or more of the CMs in dependence upon their respective current measurement capabilities.

18. The method of claim 17, comprising generating a measurement plan at the MC, and communicating measurement requests to the one or more of the CMs in accordance with the measurement plan.

19. The method of claim 18, wherein the external MC collects CM measurement capability information indicating the current measurement capabilities of each of the plurality of CMs, stores said information in computer-readable memory, and generates the measurement plan in dependence upon the stored CM measurement capability information.

* * * * *